(12) United States Patent
Leitner et al.

(10) Patent No.: US 10,918,972 B2
(45) Date of Patent: Feb. 16, 2021

(54) METHODS FOR THE SEPARATION OF AT LEAST ONE EMULSION BY APPLYING AN ELECTRICAL FIELD AND DEVICE FOR CARRYING OUT SAID METHOD

(71) Applicant: Borealis AG, Vienna (AT)

(72) Inventors: Andreas Leitner, Freistadt (AT); Michael Schadenböck, Enns (AT); Udo Muster, Salzburg (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 16/073,394

(22) PCT Filed: Jan. 27, 2017

(86) PCT No.: PCT/EP2017/051719
§ 371 (c)(1),
(2) Date: Jul. 27, 2018

(87) PCT Pub. No.: WO2017/129722
PCT Pub. Date: Aug. 3, 2017

(65) Prior Publication Data
US 2019/0038998 A1 Feb. 7, 2019

(30) Foreign Application Priority Data

Jan. 29, 2016 (EP) .................................. 16153408

(51) Int. Cl.
*B01D 17/06* (2006.01)
*B03C 11/00* (2006.01)
*C10G 33/02* (2006.01)

(52) U.S. Cl.
CPC .............. *B01D 17/06* (2013.01); *B03C 11/00* (2013.01); *C10G 33/02* (2013.01); *B03C 2201/02* (2013.01)

(58) Field of Classification Search
CPC ...................................................... B01D 17/06
See application file for complete search history.

(56) References Cited

U.S. PATENT DOCUMENTS

| 2,849,395 A | 8/1958 | Wintermute |
| 4,400,253 A | 8/1983 | Prestridge et al. |

(Continued)

FOREIGN PATENT DOCUMENTS

| DE | 3709456 A1 | 10/1988 |
| DE | 4443297 C1 | 3/1996 |

(Continued)

OTHER PUBLICATIONS

Machine translation of DE3709456. (Year: 1988).*

(Continued)

*Primary Examiner* — Brian W Cohen
(74) *Attorney, Agent, or Firm* — The Webb Law Firm

(57) ABSTRACT

Disclosed is a method for the break-up of at least one emulsion and separation of the light and heavy phase with at least an de-emulsification rate of more than 9% in only one apparatus within less than 5 min by applying at least one time dependent electrical field. The electrical field is a high frequency singular alternating current field with an electrical field strength between 2,000 and 100,000 V/m and a frequency between 12,000 Hz and 200,000 Hz. The present invention relates furthermore to a method for the treatment of at least one emulsion by applying at least one direct current field and at least one high frequency alternating current field.

7 Claims, 13 Drawing Sheets

(56) References Cited

U.S. PATENT DOCUMENTS

| | | |
|---|---|---|
| 4,584,083 A | 4/1986 | Wagner et al. |
| 4,927,511 A | 5/1990 | Friehmelt et al. |
| 5,338,421 A | 8/1994 | Abe et al. |
| 5,352,343 A | 10/1994 | Bailes et al. |
| 5,580,464 A | 12/1996 | Bailes |
| 5,861,089 A | 1/1999 | Gatti et al. |
| 6,113,765 A | 9/2000 | Wagner et al. |
| 6,228,239 B1 | 5/2001 | Manalastas et al. |
| 6,428,669 B2 | 8/2002 | Klippel et al. |
| 6,860,979 B2 | 3/2005 | Sams |
| 9,764,253 B2 | 9/2017 | Sams et al. |
| 9,764,336 B2 | 9/2017 | Sams et al. |
| 9,975,064 B2 | 5/2018 | Mahmoudi et al. |
| 2001/0017264 A1 | 8/2001 | Klippel et al. |
| 2004/0144640 A1 | 7/2004 | Nilsen et al. |
| 2013/0082005 A1 | 4/2013 | Sams et al. |

FOREIGN PATENT DOCUMENTS

| | | |
|---|---|---|
| DE | 102011008183 A1 | 7/2012 |
| EP | 0317816 A1 | 5/1989 |
| EP | 0468954 A2 | 1/1992 |
| EP | 0841362 A2 | 5/1998 |
| GB | 2171031 A | 8/1986 |
| GB | 2249741 A | 5/1992 |
| RU | 2033238 C1 | 4/1995 |
| RU | 2093243 C1 | 10/1997 |
| RU | 2174857 C2 | 10/2001 |
| RU | 132735 U1 | 4/2013 |
| SU | 1006384 A1 | 3/1983 |
| SU | 1274717 A1 | 12/1986 |
| SU | 1761683 A1 | 9/1992 |
| WO | 9617667 A2 | 6/1996 |
| WO | 0050540 A1 | 8/2000 |
| WO | 2004014512 A2 | 2/2004 |
| WO | 2008066392 A2 | 6/2008 |
| WO | 2008127932 A1 | 10/2008 |
| WO | 2012019082 A1 | 2/2012 |
| WO | 2014172504 A1 | 10/2014 |

OTHER PUBLICATIONS

Machine translation of EP0468954. (Year: 1992).*
Bailes et al., "An Experimental Investigation Into the Use of High Voltage D.C. Fields for Liquid Phase Seperation", Trans. IChemE, 1981, pp. 229-237, vol. 59.
Bailes, "An Electrical Model for Coalescers That Employ Pulsed DC Fields", Trans. IChemE, Part A, 1995, vol. 73, pp. 559-566.
Brown et al. "Effect of Oscillating Electric Fields on Coalescence in Liquid+Liquid Systems", Trans. Faraday Soc.,1995, vol. 61, pp. 1754-1760.
Draxler et al., "Auslegungskriterien für elektrostatische Emulsionsspaltanlagen", Chem.-Ing.-Tech., 1990, vol. 62:7 pp. 525-530, English-language Abstract.
Eow et al. "Electrostatic enhancement of coalescence of water droplets in oil: a review of the technology" Chemical Engineering Journal, 2002, pp. 357-368, vol. 85.
Feng et al, in: Li and Strathmann (eds.) Separation Technology, NY 1988 p. $227/_{238}$; English-language Abstract only.
Mhatre et al., "Electrostatic phase separation: A review", Chemical Engineering Research and Design, 2015, vol. 96, pp. 177-195.
Ortmayr et al., "Verfahren zum Spalten von Emulsionen" Chem.-Ing.-Tech., 64, (1992), No. 9, pp. 803-804, English-language Abstract only.
Waterman, "Electrical Coalescers", Chemical Engineering Progress, 1965, vol. 61:10, pp. 51-57.

* cited by examiner

METHODS FOR THE SEPARATION OF AT LEAST ONE EMULSION BY APPLYING AN ELECTRICAL FIELD AND DEVICE FOR CARRYING OUT SAID METHOD

CROSS-REFERENCE TO RELATED APPLICATIONS

This application is the United States national phase of International Application No. PCT/EP2017/051719 filed Jan. 27, 2017, and claims priority to European Patent Application No. 16153408.6 filed Jan. 29, 2016, the disclosures of which are hereby incorporated in their entirety by reference.

BACKGROUND OF THE INVENTION

Field of the Invention

The present invention is directed to a method for the treatment at least one emulsion by applying at least one time dependent electrical field and a device for carrying out the method.

Description of Related Art

A liquid/liquid dispersion and especially an emulsion is a mixture of 2 or more liquids that are normally immiscible, such as oil and water. One of the liquids (inner phase) is dispersed in the other liquid (outer or continuous phase) in form of fine droplets. Thereby emulsions show the smallest sized distributed droplets. In general, also emulsions are thermodynamically instable, whereby due to the free enthalpy ($\Delta G$ equals negative) the small droplets coalesce to larger droplets. Due to gravity the two phases finally separate. Nevertheless emulsion are temporary thermodynamically stable and thus the break-up, coalescence and settling of the droplets need an appropriate time. Thus, well known separation apparatuses are huge and bulky.

In many chemical processes, efficient removal of a dispersed water phase from a continuous oil phase is highly desirable. Several commercially available methods are described in the professional literature (EOW, J. S.; GHADIRI, M.: Electrostatic enhancement of coalescence of water droplets in oil: a review of the technology; Chem. Eng. Journal, pp. 357-368, No. 85, 2002).

Commercially available methods can be roughly categorized in
  Physical methods (e.g. Adsorption, Microwave, Ultrasonic, Flotation);
  Mechanical methods (e.g. Filtration, Gravity, Centrifugation, Membrane-separation);
  Thermal methods (e.g. Heating, Vaporization, Incineration, Freeze-drying);
  Chemical methods (e.g. Acid- or alkaline adjustment (pH-adjustment), Salting-out, Precipitation, Flocculation, Addition of poly-electrolytes or demulsifiers), and
  Electrical methods (electro-coalescence, electrocoagulation etc.).

The methods differ in their applied physical/chemical principles of operation, such as influencing the
  interfacial tension between water and oil phases (e.g. out-salting, de-emulsification, pH-adjustment),
  decreasing the viscosity (e.g. thermal treatment of crude oil emulsions), and/or
  effecting higher separation forces on the droplets (e.g. centrifugation, electro-coalescence).

Each of the first four classified methods plus the electro-coagulation has its own advantages and disadvantages, e.g. chemical demulsifiers can advantageously modify the water/oil interfacial properties, thus allowing water droplets to coalesce more easily into larger droplets. However additional problems are encountered in the removal of the agents from the separated aqueous and/or oil phases. pH-Adjustment works sometimes efficient when separating Oil-in-Water (O/W)-emulsions, however fails principally in case of Water-in-Oil (W/O)-emulsions. Latter emulsion-type (W/O-emulsion) is main object of the present invention. Centrifugation is related to high operation costs (mechanical acceleration, material and apparatus strength, maintenance). Heat treatment can reduce the viscosity of the oil, thus allowing any water droplet to fall more rapidly through the oil phase and further advantageously helps in the separation of any entrained gas in the gained crude oil for example. However, heat, physical, mechanical and chemical treatment is rather expensive, and heating has furthermore a tendency to result in high fuel consumption.

Thus, the object of the present invention was now to overcome the disadvantages of the presently applied methods, in particular to provide a method for separating emulsions in an energy and cost efficient manner providing a high degree of separation in short residence times. Electro-coagulation, wherein an electrode serves as a chemical reactant, is not part of the present invention.

SUMMARY OF THE INVENTION

According to the invention at least one time varying or temporal changeable electrical field is applied to the emulsion to be treated or broken up. Time varying fields in this context are Alternating Current (AC)-fields or Pulsed Direct-Current (DC)-fields. The invention is concerned on the high-efficient break-up of Liquid/Liquid (UL)-emulsions of the (W/O)-type and the practically complete separation (>95%) of the formed heavy and light phase in the same splitting module (apparatus) in less than 5 [min].

The application of a time varying electrical field has multiple advantages. These are the design of less mechanical strength apparatuses/machines, the complete elimination of chemicals such as de-emulsifiers and/or flocculants and auxiliary agents. Thus, electrical emulsion separation is both most effective and extremely cost-beneficial.

The present methods described allow a separation of the emulsion in a light and a heavy phase with a de-emulsification rate of at least 95%, preferably more than 97% and particular preferably of more than 99% within a short time period or residence time.

It is also to be understood that the treated emulsion is a dispersion of a polar liquid phase (often the heavy phase) in a non-polar liquid phase (often the light phase) UL-emulsion such as Water in Oil.

The de-emulsification rate is per definition:

$$\eta_{separation} = \frac{C_{X,emulsion,start} - C_{X,separated\ phase\ Y,end}}{C_{X,emulsion,start} - C^*_{X,separated\ phase\ Y,equilibrium}} * 100[\%]$$

$\eta_{separation}$    De-emulsification rate [%]

$C$    Concentration resp. content of component $x$ in either the original emulsion or in the second separated phase $y$ after treatment [wt. %]

$X, Y$    Phase $X$ dispersed in Phase $Y$, e.g. Water ($X$) in Oil ($Y$)

$C^*$    Equilibrium Concentration [wt. %]

The Electrical Field Strength E is per definition:

$$\text{Electrical field strength } \vec{E} = \frac{\text{effective Voltage}}{\text{distance of electrodes}} \left[\frac{V}{m}\right]$$

According to a first variant of the invention a method for the separation of least one emulsion by applying at least one time varying or temporal changeable electrical field is provided, wherein the at least one electrical field is a singular high frequency (HF) alternating current (AC) field with an electrical field strength E between 2,000 and 100,000 V/m and a high frequency (HF) between >10,000 Hz and 200,000 Hz.

Within the meaning of the present invention the expression High frequency (HF) means frequencies of more than 1,000 [Hz] and the expression Low frequency (LF) means frequencies lower than 1,000 [Hz] and especially the electrical net frequencies of 50/60 Hz in Europe/USA.

In an embodiment of the present method the at least one HF/AC-field is applied with an electrical field strength between 2,000 and 100,000 V/m and a high frequency between 12,000 and 150,000 Hz, preferably between 15,000 and 100,000 Hz, in particular preferably between 20,000 and 70,000 Hz, most preferably between 25,000 and 50,000 Hz.

Only the combination of the electrical parameters of a high electrical field strength (E) and a high frequency (HF) allows for a complete break-up of the emulsion and complete separation of the light and heavy phases in only one apparatus within less than 5 min.

In the most preferred embodiment the HF/AC field is applied with a field strength between 4,000 and 70,000 V/m, preferably between 30,000 V/m and 50,000 V/m and a frequency between 12,000 and 150,000 Hz, preferably between 15,000 Hz and 100,000 Hz, in particular between 20,000 Hz and 70,000 Hz and most preferably between 25,000 and 50,000 Hz. For example, in one variant a HF/AC field has an electrical field strength between 30,000 and 50,000 V/m and a high frequency between 16,000 and 40,000 Hz.

According to a second variant of the present invention a method for the separation of at least one emulsion by applying at least one direct current (DC) field and an at least one alternating current (AC field) is provided, wherein the at least DC field and the at least one AC field are applied in series to the emulsion to be treated. In this second variant the at least one alternating current (AC) field is applied with an electrical field strength between 2,000 and 100,000 V/m and a frequency (HF) between 1,000 Hz and 200,000 Hz.

Thus, in this case a method for separating emulsions such as water-in-oil (W/O)-emulsions is described which applies a combination of electrical fields whereby the emulsified phase is separated in a view minutes completely in its singular phases. This method differs from the known emulsion separation methods using electrical fields in a serial arrangement and/or serial application of the different fields, especially by the application of an HF/AC-field in combination with a DC-field.

The present methods described allow a separation of the emulsion in a light and a heavy phase with a de-emulsification rate of at least 95%, preferably more than 97% and particular preferably of more than 99% within a short time period or residence time. The residence time may be less than 5 min, preferably less than 3 min, in particular preferably less than 2 min.

Only the serial combination of especially an upwards orientated DC-field with a downstream orientated HF/AC-field are particularly advantageously and allow a complete ($\eta_{separation}$>99%) break-up of the emulsion and separation of the light and heavy phases in only one apparatus (module) within less than 3 min.

In case of an upstream DC field a pre-orientation and a movement/approach of the polar water molecules and/or polar components of the emulsion are affected as described in detail further below.

In an embodiment of the combined fields up to 10 DC and HF/AC fields are applied in series to the emulsion in an alternating manner. In a further embodiment the at least one DC field and the at least one HF/AC field are applied to the emulsion in the serial order DC field followed by HF/AC field.

Different combinations of DC and HF/AC fields are thereby possible. Thus, in one embodiment at least one non-pulsed or steady direct current (DC) field and at least one high frequency (HF) alternating current (AC) field is provided, wherein the at least one DC field and the at least one HF/AC field are applied in series to the emulsion to be treated.

In another embodiment at least one pulsed DC field and at least one HF/AC field are applied in series to the emulsion to be treated.

In a yet further preferred embodiment of the present method the at least one DC field and the at least one AC field are applied to the emulsion in the serial order DC field followed by HF/AC field, i.e. the DC field is arranged or applied to the emulsion upstream of the HF/AC field.

In another preferred embodiment is also possible to apply the at least one HF/AC field to the emulsion in the serial order HF/AC field followed by DC-field, i.e. the at least one HF/AC field is arranged or applied upstream of the DC field.

It is also possible and conceivable to apply at least one DC field and at least two AC fields to the emulsion. In such a case the at least one DC field and the at least two AC fields are applied to the emulsion in the serial order first HF/AC field followed by DC field followed by HF/AC field. In other words, the at least first HF/AC field is applied upstream of the DC field and the at least one second HF/AC field is applied downstream of the DC field.

In case of an upstream DC field a pre-orientation and a movement/approach of the polar water molecules and/or polar components of the emulsion are affected as described in detail further below.

Amongst the above described possible arrangements and order of application of DC and HF/AC fields the following combinations are the most preferred:
- Steady DC-field upstream of a HF/AC-field (i.e. $1^{st}$ DC, $2^{nd}$ HF/AC);
- Pulsed DC-field upstream of a HF/AC-field, (i.e. $1^{st}$ pulsed DC, $2^{nd}$ HF/AC);
- HF/AC-field upstream of steady DC-field (i.e. $1^{st}$ HF/AC, $2^{nd}$ steady DC), and
- HF/AC-field upstream of a pulsed DC-field (i.e. $1^{st}$ HF/AC, $2^{nd}$ pulsed DC).

Within the meaning of the present invention "upstream" means that the respective first field is arranged or applied in front of the respective second field; e.g. steady DC-field in front of or before HF/AC-field.

The field strength of the at least one HF/AC field applied to the emulsion in the combined method is in the range between 2,000 and 100,000 V/m, preferably between 4,000 and 70,000 V/m, most preferably between 30,000 V/m and 50,000 V/m.

The frequency of the HF/AC field is between 1,000 and 200,000 Hz, preferably between 5,000 and 150,000, more preferably between 10,000 and 100,000 Hz, in particular preferably between 20,000 and 70,000 Hz, most preferably between 25,000 and 50,000 Hz.

The field strength of the at least one steady DC field applied to the emulsion in the combined method is in the range between 500 and 20,000 V/m, preferably between 1,000 and 10,000 V/m.

The field strength of the at least one pulsed DC field applied to the emulsion in the combined method is in the range between 500 and 20,000 V/m, preferably between 1.000 and 10,000 V/m and the frequency is between 1 and 1,000 Hz, preferably between 5 and 500 Hz, more preferably between 10 and 250 Hz, most preferably between 10 and 100 Hz. The combination of an electrical filed strength between 1,000 and 10,000 V/m and a frequency between 10 and 100 Hz is mostly preferred.

In another preferred embodiment of the present combined method the electrical power input of the at least one DC field applied to the emulsion is smaller than the electrical power input of the at least one HF/AC field applied to the emulsion. In other words the DC electrical power ratio is smaller than the electrical power HF/AC fraction. For example the at least one DC field can be applied with a power percentage of 5 to 50%, preferably 10 to 40%, most preferably 20 to 30% in respect to the overall applied electrical field (100%). This means in turn, that the percentage of the HF/AC-field applied is 50 to 95%, preferably 60 to 90%, most preferably 70 to 80%.

According to the preferred embodiment of a serial combination of first DC-field followed by HF/AC-field it was shown, that the specific energy input for the complete break-up and settling of a phenolic emulsion could be lowered from 10.8 Wh/kg (singular HF/AC-field) to 0.9 Wh/kg (singular DC-field) to minimal 0.36 Wh/kg (combined DC-HF/AC-field), whereby the phenolic emulsion with a water content of 25 wt. % was separated within less than 2 min.

The emulsion to be separated is a Water-in-Oil (O/W) emulsion or multiple Oil-Water-Oil (O/W/O) emulsion. Thus, the present methods are directed to the enhanced break-up of following systems: in general liquid/liquid dispersions, emulsions or multiple emulsions, especially Water-in-Oil emulsions [(W/O)-emulsions] or multiple emulsions of the (O/W/O)-emulsion type and especially to emulsions with water contents up to 70 wt %, preferably of more than 10 wt % up to 70 wt % and most preferably of more than 20 wt % up to 70 wt %.

Generally, (W/O)-emulsions are readily formed in by mixing water in oil phases in a lot of chemical and especially petrochemical processes, such as wash and neutralization operations (caustic tower wash after crack-processes, neutralization wash after chemical reaction) or by separating inorganic components such as salts by contacting an oil phase with an aqueous phase (e.g. catalyst wash) or during the production of e.g. crude oils. Latter (W/O)-emulsions show typically water contents of less than 20 wt % in average ca. 3 wt %. (W/O)-emulsions causing problems at different stages of the production such as corrosion of pipes, pumps and other processing equipment, complications due to increased emulsion viscosity (finely dispersed small water droplets), deactivation of catalysts (hydrolysis, poisoning) in the presence of water, increased transport costs, because of included water phase and finally increased operation costs by additional post-treatment plants (e.g. waste water treatment).

Thus, there are a number of commercial reasons for removing this emulsified water from organic phases. In particular, electrical emulsion separation is both most effective and extremely cost-beneficial. The unique disadvantage of electrical splitting of emulsions can be found in their known applicability on preferable (W/O)-emulsions and not on the more often (O/W)-emulsions.

The state of the art in electrical treatment of (W/O)-emulsions has been predominately defined in crude oil production and petrochemical processes. Typical crude-oil desalination plants operate preferably with Alternating Current (AC)-fields at net (low) frequencies (50/60 Hz), and to a lesser extent, Direct Current (DC)-fields are used for the separation of water droplets from crude oil (danger on short-circuiting and electrolysis phenomena especially by the usage of bare metal electrodes). Thereby, the conventional electro-separators are huge, as large residence times are required for the electro-coalescence regions and settling zones to separate the enlarged water droplets from the crude oil.

Nevertheless, only timely varying electrical fields such as AC- or a serial combination of AC- and DC-fields (as applied in the present methods) can influence the strength of the stabilizing film by induced vibration of the relevant electrostatic double layer. The effect lead to a weakness of the electrostatic stabilizing film (surrounding the droplet), which is also the relevant energy barrier. This energy barrier of the droplets can only be influenced by timely changing electrical field methods, because the stabilizing electrostatic double layer (4-potential) is particularly influenced by the frequency of the applied electrical field.

In DRAXLER, J.; MARR, R. (Auslegungskriterien für elektrostatische Emulsionsspaltanlagen; Chem.-Ing.-Tech., 62, pp. 525-530, No. 7, 1990) it is reported, that the implementation of the Liquid-Membrane-Permeation (LMP) process lead to remarkable progresses in the field of electrical splitting of (W/O)-emulsions. The emulsions in the LMP-process are deliberate synthetically stabilized (necessary life time during mass transfer operation/apparatus) and following are more stable than crude-oil emulsions. The (W/O)-emulsions in the LMP-process are characterized by extreme small sized water droplets, narrow droplet size distributions and a higher content of water in comparison to typically crude-oil-emulsions. Thus, the well-known electrical methods for emulsion splitting (crude oil emulsion electrical splitting) are extremely inefficient for these special types of (W/O)-emulsions. Thus, in Draxler et al. both High Voltage (HV) and High Frequency (HF) Alternating Current (AC)-fields are recommended for an enhanced separation and efficient enough emulsion separation rate of such synthetically stabilized (W/O)-emulsions.

Furthermore, Draxler et al. describe an existing correlation between maximal allowed voltage and frequency of the applied AC-field. Herein, the re-emulsification starts not as a function of applied maximal voltage alone, but rather by increasing the frequency of the applied AC-field to a maximal tolerable value. For example: Re-emulsification takes initially place at 3.000 V and by frequencies higher than 10,000 Hz. Frequencies lower than 5,000 Hz show maximal de-emulsification rate $\eta_{separation}$ of at best 70% by application of 3.000 V, maximal 55% by 1.000 V and less than 10% by 220 V. Nevertheless, that means that the break-up and separation of the light and heavy phase is despite the application of a HF/AC-field not complete, because of both missing de-emulsification efficiency or re-emulsification effects.

A further development of the HV-HF/AC-technology is described in SWATEK, H.; ORTMAYR, E.; Chem.-Ing.-Tech., 64, pp. 803-804, No. 9, 1992. Here a DC-field is overlaid (parallel) to a HF/AC-field. The DC-field is introduced by the usage of a kind parallel plate capacitor, which is overlaid with an HF/AC-field (sinus-wave). The DC-field should effect an additional positive polarisation of the water molecules. The parallel combined HF/AC-/DC-field should enhance the separation of fine dispersed water droplets of (W/O)-emulsions.

The correlation between an optimal frequency and an enhanced electro-coalescence of water droplets is not fully understood until today. Nevertheless, the magnitude of the applied frequency depends greatly on the type of electric field, as well as on the arrangement of the electrodes. In BRAUN, A. H.; HANSON, C.: Effect of oscillating electric field on coalescence in liquid-liquid systems; Trans. Faraday Soc., 61, p. 1754, 1965 is initially reported, that an optimum frequency could be observed at which coalescence occurs more efficient. More recently, the existence of an optimum frequency has also reported in BAILES, P. J.: Pulsed d.c. fields for electrostatic coalescence of water-in-oil emulsions; Trans. IChemE A, 73, pp. 559-566, 1995, whereby the adjustment of an optimal frequency is especially important at low applied potentials (DC-fields). It is reported, that in this case the insulation material and its thickness of the electrode beside the liquid composition of the emulsion are the main influencing parameters for the optimal frequency. Generally, low frequencies are usually used with pulsed DC-electrical fields. BAILES, P. J.; LARKAI, S. K. L.: Electrostatic separation of liquid dispersions; UK-Patent 2.171.031 A, 1986 applied a pulsed DC-field at a frequency less than 1 Hz. BAILES, P. J.; WATSON M.: Electrostatic and centrifugal separation of liquid dispersion; UK-Patent 2.249.741 A, 1992 used a pulse rate of 25 Hz in a rotating cylindrical coalescer, whilst in BAILES, P. J.: Resolution of emulsions; U.S. Pat. No. 5,580,464, 1996 the optimal frequency was found at 15 Hz.

(W/O)-Emulsions are especially characterized by smallest sized distributed water droplets in an oil phase (liquid/liquid-dispersion), whereby beside the movement of the droplets to each other especially the coalescence requires the overcoming of an energy barrier (comparable to a kind of activation energy). The whole mechanism of droplet-coalescence can be structured into 3 sub-steps: movement and approximation of the water droplets to each other by e.g. gravity, centrifugal or electrical forces; drain off the film between the droplets and break-up of the film and coalescence of droplets and the boundary layer (film).

The available separation technologies are primary concerned on the $1^{st}$ sub-step (movement and approximation), whereby the drain-off and the break-up of the protecting (stabilizing) film are only defined by the material properties (interfacial tension, energy barrier).

Also, the electrical caused emulsion break-up and coalescence is especially characterized by an initially increased movement and approximation of the water-droplets to each other ($1^{st}$ sub-step). This is similar to the other different separation technologies, whereby in the latter mentioned separation technologies only the movement and approximation of the water droplets can be supported. By the usage of electrical fields also the break-up of the film ($3^{rd}$ sub-step) not the drain off the film ($2^{nd}$ sub-step) can be advantageously influenced by timely varying or temporal changeable electrical fields.

All electrical analytical models show (dipole-dipole interference, electrophoresis, di-electrophoresis), that the resulting electrical force $F_{electric}$ on the water droplet is a function of $2^{nd}$ order of the electrical field strength E applied:

$$F_{electric} = f(E^2(t))$$

The maximal possible electrical field strength E supports the movement of the water droplets to each other. Nevertheless, the maximal tolerable electrical field strength E is limited by the danger of short-circuits; break down of the electrical field itself and the appearance of re-emulsification effects. Similar, the $2^{nd}$ sup-step of the whole coalescence mechanism, the drain-off the film cannot be influenced—also not by the application of electrical fields. However, the $3^{rd}$ sub step of the whole mechanism the break-up of the film is supported by electrical fields, what can be also macroscopic observed, especially by the application of high frequencies in AC-fields. The pulsation of the electrical field supports the break-up of the film between two droplets.

Timely varying electrical fields such as AC- or pulsed DC-fields can at least influence the strength of the stabilizing film by induced vibration of the relevant electrostatic double layer and their "bounded" water-molecule cluster-structures. The effect lead to a weakening of the electrostatic stabilizing film (surrounding the droplet), which is also the relevant energy barrier. This energy barrier of the droplets can only be influenced by changing or timely modifiable electrical field methods, because the stabilizing electrostatic double layer ($\xi$-potential) is particularly influenced by the frequency of the applied varying electrical field.

The present methods according to the invention allow an enhanced break-up of liquid/liquid-dispersions and especially emulsions under impact of singular and combined electrical fields by an optimized process parameter adjustment, optimized design of electro-separator and finally combination of electrical fields therein, especially regarding the enhanced break-up of a Phenol containing emulsion, independently on the emulsion type, preferably on the break-up of (W/O)-emulsions and most preferably on emulsions with water contents of more than 20 wt. % up to 70 wt. %.

The emulsion splitting or treating method of the present invention allow an enhanced break-up of following systems: in general liquid/liquid-dispersions, emulsions or multiple emulsions, especially water in oil emulsions [(W/O)-emulsions] or multiple emulsions of the (O/W/O)-emulsion type, particularly emulsions with water contents up to 70 wt. %, preferably of more than 10 wt. % up to 70 wt. % and most preferably of more than 20 wt. % up to 70 wt. % and quite particularly (W/O)-emulsions from a petrochemical process like emulsions from phenol synthesis (cleavage wash, Hock synthesis); washing procedures (e.g. catalyst wash, caustic or alkaline wash, BTX-wash operations, atmospheric and vacuum distillation fractions to wash towers); cooling procedures (e.g. quench wash tower) and/or crude oil desalting steps. In a most preferred embodiment the emulsion to be separated is a phenolic water emulsion of the Hock-synthesis with an equimolar Phenol/Acetone-ratio and water contents up to 70 wt. %, especially 20 to 70 wt. % and most preferably of 25 wt. %.

As described above the serial combination of an upstream orientated DC-field followed by a downstream orientated High Frequency—HF/AC-field is a preferable embodiment of the present method. The upstream orientated DC-field causes initially the polarization of the water molecules and thus an enhanced movement of the water droplets (dipoles) to each other ($1^{st}$ sub-step of coalescence; movement and approximation) by increased/optimized electrical field strength. This movement and approximation of water droplets can also be macroscopic observed by the formation of pre-orientated or better coordinated water molecule clusters, the so-called string of pearls formation (transparent appearance of the heavy (aqueous) phase).

In the downstream orientated High Frequency HF-/AC-field an enhanced coalescence of the water droplets to finally an associated aqueous bulk phase can be macroscopic observed. The downstream orientated HF/AC-field, especially operated at high frequencies, can interact with the pre-orientated and nearby orientated water molecule clusters resulting from the pre-orientated DC-field. The electrostatic protective layer is not able to follow high frequent polarity changes of an HF/AC field, while water droplets at least partially take up high frequent vibrations, supporting especially the break-up of the film ($3^{rd}$ sub-step of coalescence). The downstream orientated HF/AC-field can at least influence the strength of the stabilizing film by induced vibration of the relevant electrostatic double layer and their "bounded" water-molecule cluster-structures. The water molecule clusters are at lowest distance as possible, because of the pre-orientated DC-field. The High Frequency effect lead quickly to a weakening of the electrostatic stabilizing film (surrounding the droplet), which is also the relevant energy barrier. This electrostatic stabilizing layer is both weakened and not able to follow the high frequent polarity changes of the HF/AC-field, while the water droplet clusters are able to follow the high frequent oscillations. Water droplet clusters take up high frequent vibrations, affecting especially the break-up of the stabilizing film. A coalesced aqueous phase is formed promptly. Furthermore, the specific energy consumption for the break-up of the emulsion can be reduced significantly to a minimum by the serial combination of a $1^{st}$-DC—with a $2^{nd}$-HF/AC-field, remarkable in comparison to singular AC- or DC-fields.

In case of the most preferred embodiment of the method for separating the emulsion, which is a combination of DC field with an HF/AC-field wherein the DC field is upstream of the high frequent HF/AC field, the emulsion is introduced at first via the DC field. Thereby the polar components moved towards each other, the dipoles of the polar components (for instance emulsified water droplets) align and orient themselves to a coordinated phase. A coalescence of the emulsion droplets into a heavier and a lighter unified phase already takes place partially in the DC field.

In one preferred embodiment of the present method the complete separation of polar (water) and less polar (nonpolar) phases of the emulsion phase takes place in only a few minutes. The required separation time can be less than 5 min, preferably less than 3 min, in particular preferably less than 2 min.

It also has been shown that a doubling of the frequency at the same voltage amplitude can effect a halving of the separation time. Due to the higher coalescence efficiency when using high frequency fields there is the possibility to obtain high flow rates in small separation volumes, while the presently known coalescence systems often require bulky device volumes. Opposite to the results of Draxler et al. a re-emulsification was not noted by the electrical splitting of a phenolic emulsion in a HF/AC-field of the present invention.

The extremely short de-emulsification times are advantageously in the dimensioning of the separation device, i.e. in case of a short de-emulsification time it is sufficient to provide a device with small volume. Thus, a complete break-up of the emulsion and complete separation of the light and heavy phases in only one apparatus within less than 5 min can be realized.

The present methods are conducted in a device for separating or treating at least one emulsion comprising the following features:
- at least one vessel, preferably a horizontally arranged vessel, with at least one module (or element or component)
- at least one first electrode positioned alongside (for example along the walls) the at least one module of the vessel, and
- at least one second electrode positioned within the at least one module of the vessel, preferably in the center of the module of the vessel.

The vessel may also be described as a combination of several modules each comprising the electrodes. Thus, the individual (electro-coalescence) modules (for example up to 10 modules) can be combined to an electrical separator/decanter vessel, preferably in a cylindrical horizontal separator/decanter vessel.

In a preferred embodiment of the present device at least one further third electrode is positioned alongside the at least one module of the vessel, in particular alongside the inner or outer circumference of the at least one module of the vessel.

In a yet other preferred embodiment of the present device the at least one module of the vessel is separated into at least two sections, preferably into at least three sections. In this case at least one HF/AC-field is applied to at least one section and at least one DC field is applied to the at least other section.

In case of three sections there is a combination of a HF/AC-field applied in the first section and third section by combining electrodes positioned along the walls of the vessel or module and the central positioned electrode in the vessel or module interior. The DC field can be applied in the second middle section by a third electrode combined with the central positioned electrode. All three sections are insulated against each other by an appropriate sealing such as PTFE sealing.

In all variants of the present device the HF/AC-field is generated between the electrodes by at least one HF/AC-field generator and the DC-field is generated by at least one DC-field generator.

The present device can also be described with the following features:
- at least one elongated, preferably horizontally arranged electro-coalescence module having at least one inlet for the at least one emulsion to be separated, at least one outlet for the separated heavy (water) phase and at least one outlet for the separated light (oil) phase,
- at least one first electrode positioned within the at least one electro-coalescence module, preferably in the center of the electro-coalescence module,
- at least one second counter electrode positioned along the outside of the at least one electro-coalescence module for applying at least one AC-field, such as a HF/AC-field, and
- at least one additional cylindrical third electrode positioned at a predetermined position along the (inside or outside) electro-coalescence module for applying at least one DC-field.

Furthermore the presently used electro-coalescence module is separated into at least two sections. Thereby the at least one cylindrical electrode for applying at least on DC-field is used to divide the electro-coalescence module into said sections. This can be done by positioning the DC-field at any predetermined position alongside the electro-coalescence module, preferably in front of the HF/AC-field.

The at least one electrode positioned in the center of the vessel is preferably arranged along the symmetrical axis of a cylindrical electro-coalescence module and is preferably designed at a rod shaped electrode used for grounding.

The specific arrangement of the electrodes and the division of the electro-coalescence module in multiple sections enables that at least one HF/AC-field can be applied to at least one section and at the least one DC-field is applied to the at least other section.

This can be done such that the at least one DC-section is applied or arranged upstream of the at least one HF/AC-section or the at least one HF/AC-section is applied upstream of the at least one DC-section. Furthermore, it is also possible to use three sections whereby at least two HF/AC-sections and one DC-section are provided such that at least one first HF/AC-section is upstream of the at least one DC-section and the at least one second HF/AC-section is downstream of the at least one DC-section.

BRIEF DESCRIPTION OF THE DRAWINGS

The present invention is subsequently described with reference to the figures of the drawings by means of multiple examples. It shows.

DESCRIPTION OF THE INVENTION

Figure 1:
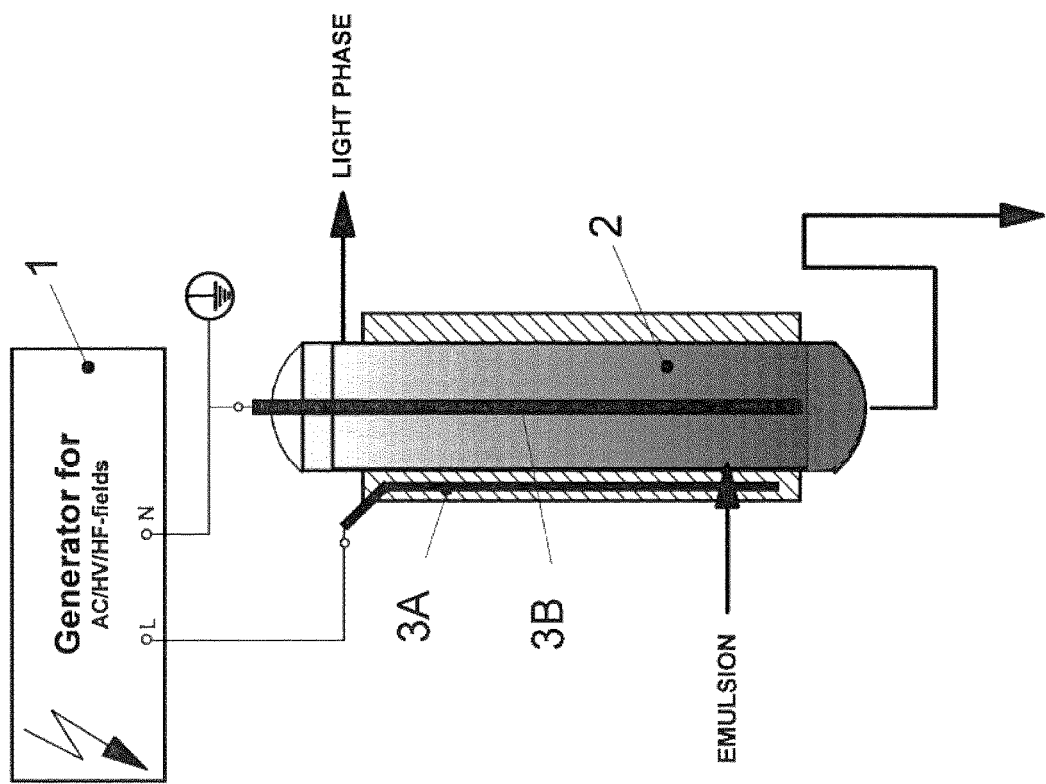
FIG. 1 a first embodiment of a device for separating an emulsion according to the invention.

FIG. 1 shows a LAB GLASS TUBE SEPARATOR, which can be operated continuously or preferable discontinuously. The inner of the glass tube separator (2) is filled with the emulsion phase (Volume, V~90 ml) and includes the central positioned bare metallic electrode (3B, Ø 1 or 6 mm). The electrode could be coated by an insulating material such as PTFE, E-CTFE or similar. The construction of the lab glass tube separator includes a double glass tube design. Thus, the glass wall—between the inner space and the outer glass chamber—acts as an insulator. The volume of the chamber is filled with a high-conductive solution, such as aqueous 2 mol/l sulfuric acid or similar liquids (ionic liquids, aqueous salt solutions etc.). Metallic electrodes are positioned both in the outer chamber (2 m $H_2SO_4$), which also forms the counter electrode (3A) and in the center of the lab glass tube separator (3B). The central electrode (3B) is earthed. Electrical fields can be generated between the electrodes (3A/3B) by a generator (transformer, 1). Thereby singular HF/AC-fields can be generated and applied in the lab glass tube separator.

In batch operation the inner volume of the lab glass tube separator is filled initially with the emulsion phase and following the electrical field is applied. In continuous operation, the (W/O)-emulsion is fed in the lower section of the lab glass tube separator. The emulsion is separated into a light and heavy phase by application of an electrical field. The light (organic) phase emerges the glass tube separator on the top, whereby the heavy (water) phase is discharged on the bottom of the glass tube separator. The level of the heavy phase in the decanter separator is controlled by a syphon.

Figure 2:
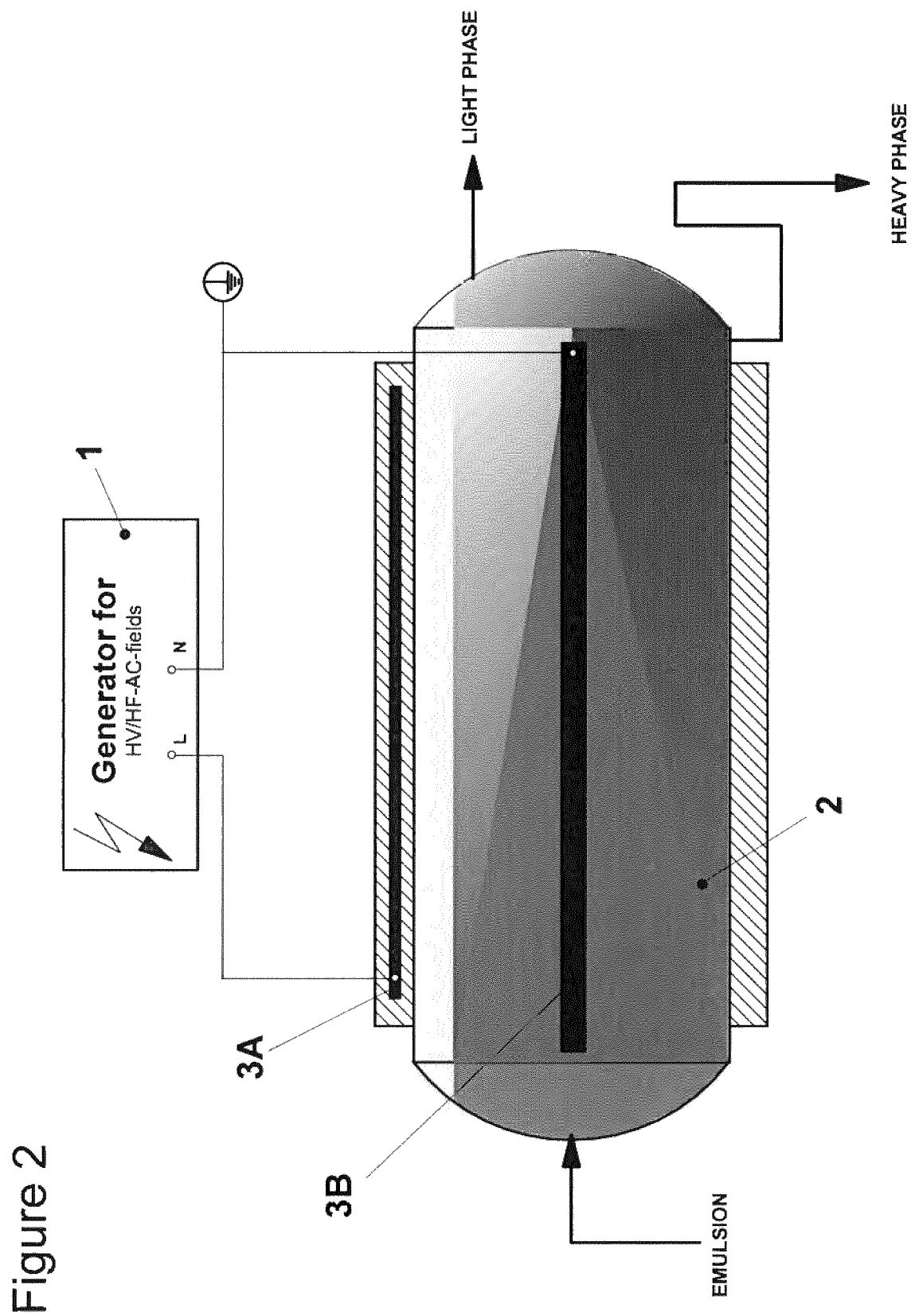
FIG. 2 a second embodiment of a device for separating an emulsion according to the invention.

FIG. 2 shows the separating vessel when applying singular HF/AC-fields in (dis-) continuous operation. Here a 1-ZONE (1Z)—HORIZONTAL (lying) GLASS DECANTER SEPARATOR is shown, which can be operated discontinuously or preferable continuously. The inner of the horizontal glass decanter separator (2) is filled with the emulsion phase (Volume, V~340 ml) and includes the central positioned bare metallic electrode (3B). The central electrode (3B) is earthed. The construction of the horizontal glass decanter separator includes a double glass tube design. Thus, the glass wall—between the inner space and the outer glass chamber—acts as an insulator. The volume of the chamber is filled with a high-conductive solution, such as aqueous 2 mol/l sulfuric acid or similar liquids (ionic liquids, aqueous salt solutions etc.). Metallic electrodes are positioned both in the outer chamber, which also forms the counter electrode (3A) and in the center of the horizontal glass decanter separator (3B). Electrical fields can be generated between the electrodes (3A/3B) by a generator (transformer, 1). Thereby singular HF/AC-fields can be generated and applied in the horizontal glass decanter separator. In batch operation the inner volume of the lab glass tube separator is filled initially with the emulsion phase and following the electrical field is applied.

In continuous operation, the emulsion phase is fed with a peristaltic pump from the emulsion feed tank to the central orientated inlet tube of the horizontal glass decanter separator. The emulsion phase is separated into a light and heavy phase by application of an electrical field over the length of the horizontal glass decanter separator. The light (organic) phase emerges the horizontal glass decanter separator on the top, whereby the heavy (water) phase is discharged on the bottom of the horizontal decanter separator. The level of the heavy phase in the decanter separator is controlled by a syphon.

Figure 3:
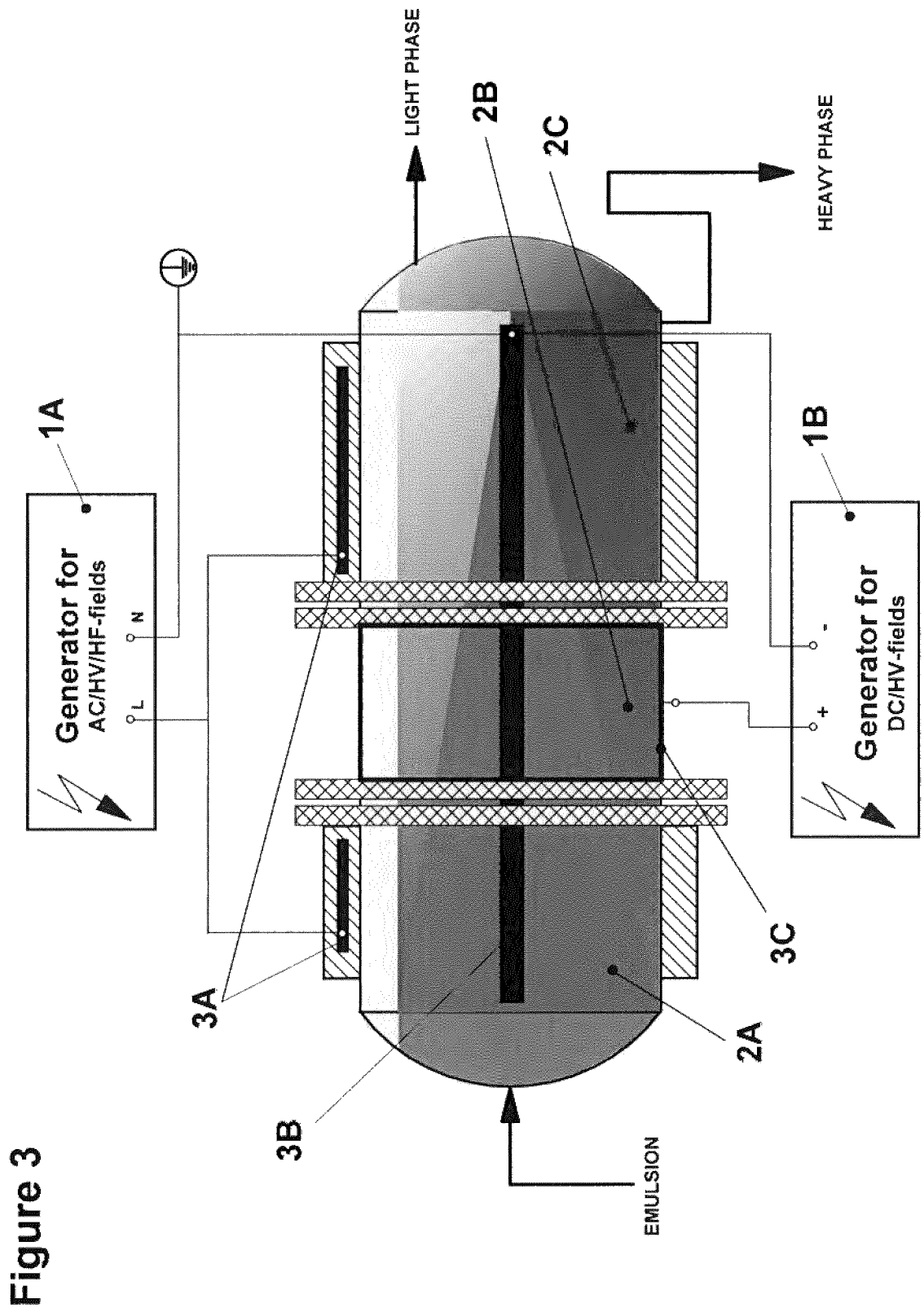
FIG. 3 a third embodiment of a device for separating an emulsion according to the invention.

In FIG. 3 another embodiment of the separating device is illustrated for applying AC/DC fields in series in continuous operation. Here a 3 ZONES (3Z)—HORIZONTAL (lying) GLASS DECANTER SEPARATOR is shown, which is generally operated continuously. The principal design is similar to the before described 1-Zone-horizontal (lying) glass decanter separator. The whole decanter length can be divided into 3 sections. HF/AC-fields can be applied in the $1^{st}$-(2A) and/or the $3^{rd}$-section (2C) in combination with a DC-field in the middle or $2^{nd}$-section (2B). Total volume is 435 ml, starting with 130 ml ($1^{st}$), 95 ml ($2^{nd}$) and 210 ml ($3^{rd}$). The inner volume forms the emulsion space (2A/2B/2C). HF/AC-fields can be applied by combination of counter electrodes (3A) in the $1^{st}/3^{rd}$-section with the central orientated and earthed electrode (3B). Hereby the glass wall forms an insulator. The DC-field can be applied in the $2^{nd}$-segment, by a metallic tube forming the outer electrode (3C), which is combined with the central orientated and earthed electrode (3B). All 3 zones are insulated against each other by PTFE-sealing's. Electrical HF/AC-fields can be generated between the electrodes (3A/3B) by an HF/AC-generator (transformer, 1A) in the $1^{st}$- and/or $3^{rd}$-segment. DC-fields can be generated between the electrodes (3C/3B) by a DC-generator (transformer, 1B) in the $2^{nd}$-segment. The design of the 3Z-horizontal (lying) glass decanter allows the serial combinations of HF/AC-with DC-fields vice versa.

In continuous operation, the emulsion phase is fed with a peristaltic pump from the emulsion feed tank to the central orientated inlet tube of the 3Z-horizontal glass decanter separator. The emulsion phase is separated into a light and heavy phase by application of electrical fields in combination over the length of the 3Z-horizontal glass decanter separator. The light (organic) phase emerges the 3Z-horizontal glass decanter separator on the top, whereby the heavy (water) phase is discharged on the bottom of the horizontal decanter separator. The level of the heavy phase in the decanter separator is controlled by a syphon.

Figure 4:
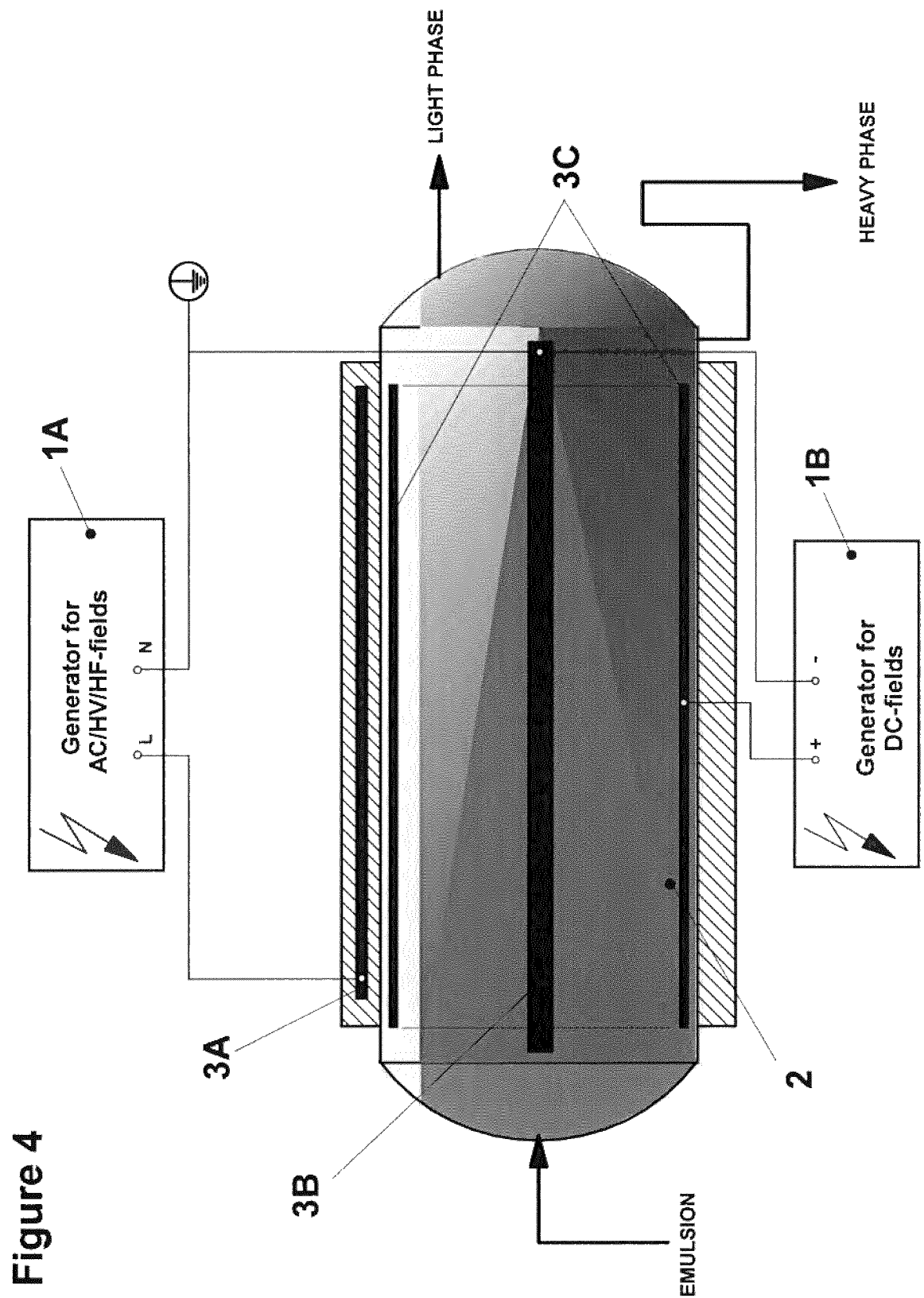
FIG. 4 a fourth embodiment of a device for separating an emulsion according to the invention.

In FIG. 4 a separator is illustrated which can be used for overlaid (parallel) AC/DC-fields in continuous operation. Here the 1-ZONE (1Z)—HORIZONTAL (lying) GLASS DECANTER SEPARATOR is operated preferable continuously. The principal design is similar to FIG. 2. The HF/AC-field is performed completely equal to the description in FIG. 2 between the counter electrode (3A) and the central orientated and earthed bare metallic electrode (3B) with the generator (transformer, 1A). Additionally, a DC-field is generated with an inner positioned bare metallic tube (3C) in combination with the central orientated and earthed metallic electrode (3B) by a DC-Generator (transformer, 1B).

In continuous operation, the emulsion phase is fed with a peristaltic pump from the emulsion feed tank to the central orientated inlet tube of the horizontal glass decanter separator. The emulsion is separated into a light and a heavy phase by application of parallel combined (overlaid) electrical HF/AC-field with a DC-field over the total length of the horizontal glass decanter separator. The light (organic) phase emerges the horizontal glass decanter separator on the top, whereby the heavy (water) phase is discharged on the bottom of the horizontal decanter separator. The level of the heavy phase in the decanter separator is controlled by a syphon.

Definition of Water in Oil (W/O)-Emulsion (Model/Test Emulsion)

The following examples serve to illustrate discontinuous and continuous operation of the electrical emulsion separation according to the invention by means of the model emulsion water/phenol/acetone/cumene-hydroperoxide. That emulsion is obtained in the so called Hock synthesis for producing phenol and acetone, whereby the organic reaction phase is afterwards treated with an aqueous wash phase in the phenol cleavage wash unit operation. Thereby an (W/O)-emulsion is formed.

The investigated Water-in-Oil (W/O)-emulsion has a starting (feed) water-concentration of about 25 wt. %. The main component is Phenol, beside the further relevant components such as acetone, water and cumene-hydroperoxide. The initial composition of the applied phenolic (W/O)-emulsion is the following ones:

TABLE 1

Composition of applied phenolic (W/O)-emulsion during all test runs as model emulsion

| COMPONENTS | CONCENTRATION [wt. %] |
| --- | --- |
| Phenol | 44.5 |
| Acetone | 20.4 |
| Water | 25.0 |
| Cumene-hydroperoxide | 10.1 |

The phenolic (W/O)-emulsion in Tab. 1 was used in all experiments as a kind of model emulsion. The preparation of the emulsion is done both freshly and continuously with a rotor/stator mixer (Fa. IKA, Type: ULTRA TURRAX T25)—before electrical splitting experiments were executed.

It has to be mentioned that the—minimal attainable final concentration of water in the separated organic phase is the equilibrium concentration of the material phase system, which is about 10 wt. % and defines thus indirectly the maximal attainable separation performance of the test material phase system. The water content in the light (organic) phase will be analyzed indirectly by Karl Fischer method of the resulting light (organic) phase. Furthermore a continuous analysis of the water content could be performed by density measurements of the separated organic phase online.

Example 1 (Comparative Example): Batch Separation of a Phenolic (W/O)-Emulsion of Tab.1 by Applying a Singular AC-Field at the Net Frequency of 50 Hz and at Three Effective Voltage Levels of 150, 250 and 500 V The phenolic (W/O)-emulsion of Tab.1 with an initial water content of about 25 wt. % is transferred to the LAB GLASS TUBE SEPARATOR of FIG. 1. The phenolic model emulsion is electrical treated over 30 min with an AC-field at 50 Hz at three different effective Voltages (150/250/500 V)—corresponding with the electrical field strengths of approximately 9,000/15,000/30,000 V/m. The alternating voltage is generated by an AC-generator fabricated by company KNÜRR.

The results of experiment 1 in Tab. 2 show impressive, that the phenolic model emulsion of Tab. 1 cannot be broken-up both at especially frequency of 50 Hz and effective Voltages between 150 V and 500 V or more detailed electrical field strengths between 9,000 and 30,000 V/m at low frequencies of 50 Hz—this in difference to the knowledge from crude oil desalination processes. The water contents of the electrical treated organic phases conform practically to the starting water concentration of 25 wt. % of the feed emulsion after 30 min. The achieved results (non-applicability) confirm, that AC-fields at low (net) frequencies cannot break-up phenolic (W/O)-emulsions of composition of Tab. 1, which also indicates the high thermodynamically temporary stability of the phenolic emulsion test system—comparable with synthetically generated emulsions of the Liquid/Membrane/Permeation process. Such (W/O)-emulsions are thermodynamically stable over hours or days under influence of gravity alone.

TABLE 2

Batchwise operated splitting of model emulsion of Tab. 1 in an AC-field at constant net frequency of 50 [Hz] and at three different effective Voltage levels (150/250/500 [V]) - treatment period: ca. 30 [min]

| Voltage [V] | Frequency [Hz] | Water content of light (organic) phase [wt. %] |
|---|---|---|
| 150 | 50 | 24.8 |
| 150 | 50 | 25.0 |
| 250 | 50 | 24.6 |
| 250 | 50 | 24.6 |
| 500 | 50 | 24.5 |
| 500 | 50 | 24.4 |

Example 2: Continuous Separation of a Phenolic (W/O)-Emulsion of Tab.1 in a Singular AC Field at High Frequencies (3,750-32,000 Hz)

Example 2 should demonstrate that very stable (W/O)-emulsions such as the phenolic test emulsion of Tab. 1, could be broken-up also at "low" AC-voltage (electrical field strength E) of 500 V, respectively electrical field strength of app. 16.000 V/m, by application of HF/AC-fields and especially high frequencies between 3,750-32,000 Hz—this in difference to example 1 (500 V/50 Hz), where a LF/AC-field was applied.

The phenolic (W/O)-emulsion of Tab.1 with an initial water content of about 25 wt. % is transferred in the 1Z-horizontal decanter separator (see FIG. 2) and passes the separator by applying a HF/AC-field at constant effective Voltage of 500 V (resp. electrical field strength of 16.000 V/m) and variation of high frequencies in the range between 3,750-32,000 Hz. The separator is operated continuously with a constant emulsion mass flow rate of 11.1 kg/h. The resulting water content of the so treated and separated light (organic) phase was analyzed (whereby 10 wt. % water in the resulting organic phase=equilibrium water concentration of the phenolic material system).

Figure 5:
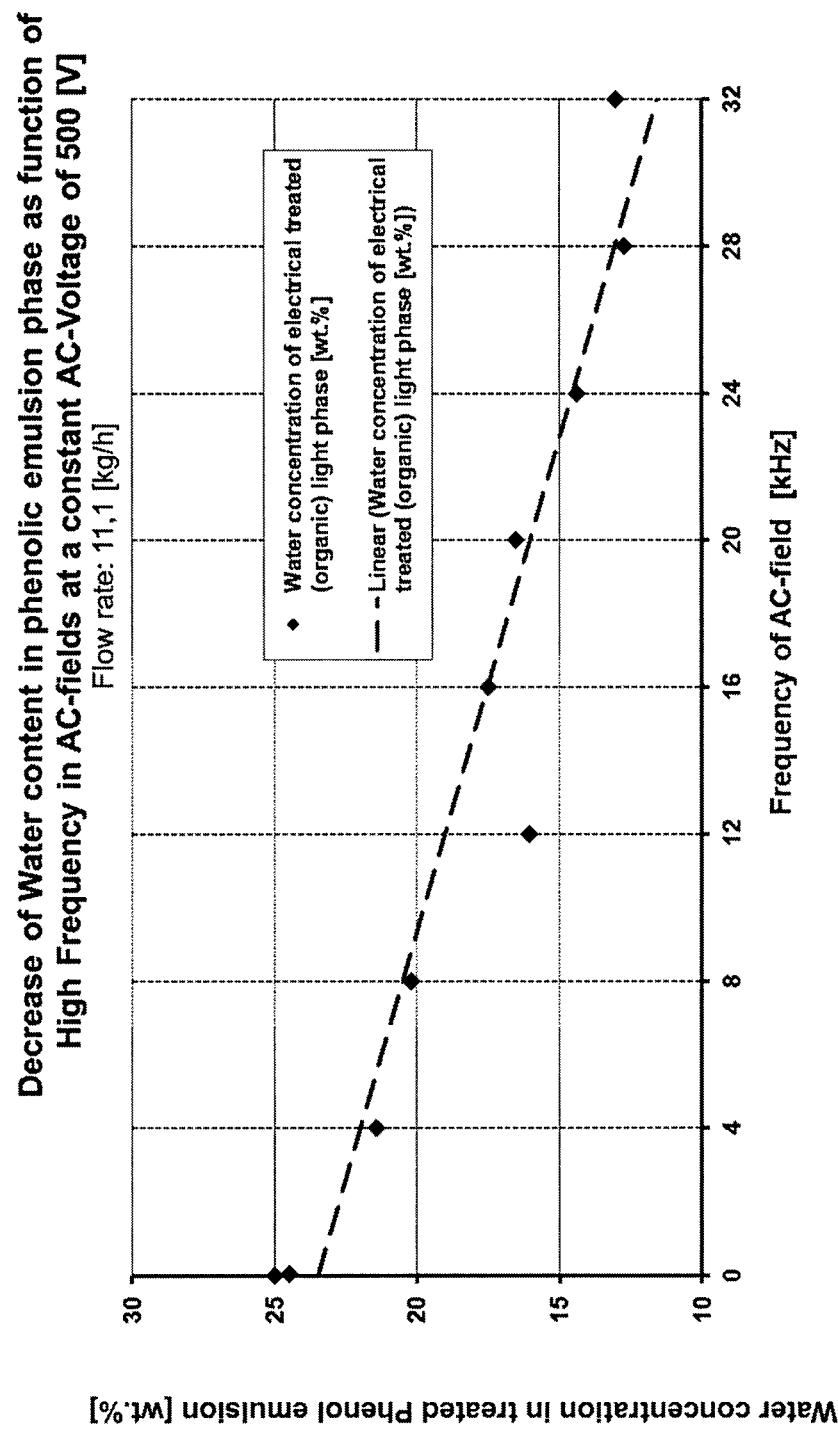
FIG. 5 a diagram depicting the residual water content of an organic phase after electrical treatment of an emulsion at a constant voltage according to the second embodiment of the present method; shown in FIG. 2

The diagram of FIG. 5 depicts the residual water content of the light (organic) phase after electrical treatment of a phenolic emulsion (feed) in the 1Z-horizontal decanter separator of FIG. 2 in continuous operation (emulsion mass flow rate: 11.1 kg/h) as function of applied high frequencies (4,000-32,000 Hz) at constant effective voltage of 500 V—corresponding to an electrical field strength of app. 16.000 V/m. The average residence time in this test series was fixed to 1.6 min.

The experiments of example 2 show that the phenolic model emulsion of Tab. 1 starts to split in an HF/AC-field (500 V) at 3,750 Hz. The residual water content of the light (organic) phase decreases remarkable by increasing the high frequency from 3,750-32,000 Hz—resp. 21.4 wt % at 3,750 Hz to 13.0 wt % at 32,000 Hz. The equilibrium water concentration of 10 wt % of the test material system cannot be reached with the chosen process parameters—e.g. too short residence time and/or electrical field strength E.

In the experiments (constant average space time) the water content could be reduced from initial 25 wt. % to approximately 13 wt. % at an effective voltage of 500 V and a high frequency of 32,000 Hz. The analytical evaluation of the test series shows a linear function of the resulting water content of the light (organic) phase from the applied high frequency. Furthermore, a disadvantageously re-emulsification was not determined in the chosen process window as it is described in Draxler et al. at 10,000 Hz for synthetically generated LMP-emulsions.

Example 3: Continuous Operated Enhanced Break-Up of a Phenolic (W/O)-Emulsion of Tab.1 in Singular DC-Fields The construction of the separation device is the 3Z-horizontal glass decanter separator (subsequently designated as 3Z-decanter separator), which is shown in FIG. 3. Thereby, only the middle segment (3C) is used by application of a singular DC-field, which is generated with a common DC-transformer (1B). The applied electrical field strengths were in the range from 1,300 to 7,000 V/m.

The electrical separation is operated continuously. The phenolic model emulsion of Tab.1 with an initial water content of 25 wt % is introduced by means of a peristaltic pump into the 3Z-decanter separator of FIG. 3. The experiments were conducted with a constant mass flow rate of the phenolic model emulsion of 11.1 kg/h (residence time fixed) at defined variable electrical DC-power inputs. The resulting outlet (light) phases of 3Z-decanter separator were analyzed on their residual water content.

Figure 6A:
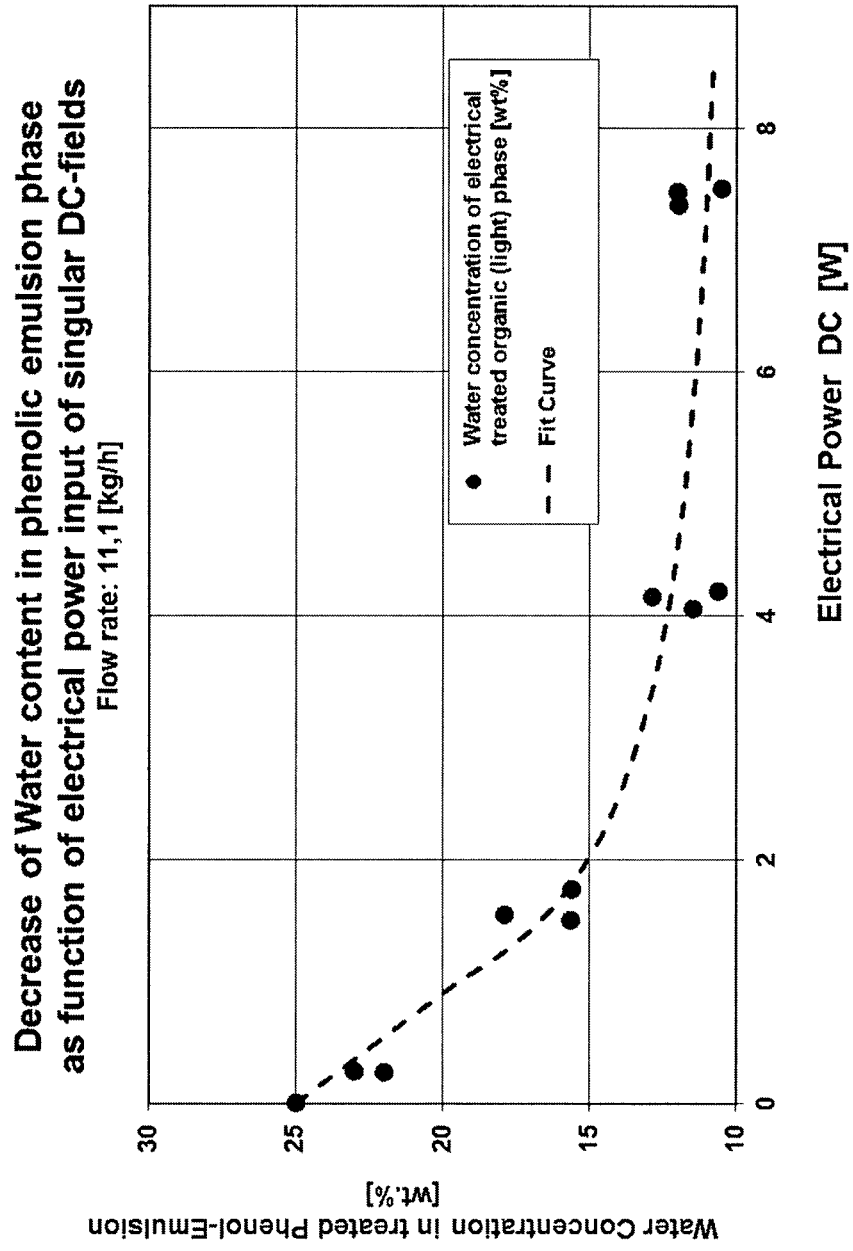
FIG. 6A a further diagram depicting the residual water content of an organic phase after electrical treatment of an emulsion according to the third embodiment of the present method; shown in FIG. 3

FIG. 6A shows the obtained results, whereby the resulting water content in the light (organic) outlet phase is shown as function of the electrical direct current power input in W. The diagram of FIG. 6A depicts the residual water content of the light (organic) phase after electrical induced separation of a phenolic emulsion (feed) in the 3Z-horizontal decanter separator of FIG. 3 (DC, middle segment 2B) in continuous operation (emulsion mass flow rate: 11.1 kg/h) as function of introduced DC electrical power in W by applying a singular DC field.

A DC-power input of at least 9 W is necessary to guarantee the complete separation (equilibrium water content of 10 wt % of the model emulsion at a continuous mass flow rate of 11.1 kg/h through the 3Z-horizontal decanter separator (=fixed average space time) within less than 2 min. Furthermore, FIG. 6A illustrates also, that a complete separation of the phenolic emulsion of Tab.1 is not achievable with lower DC-power inputs than 9 W.

Figure 6B:
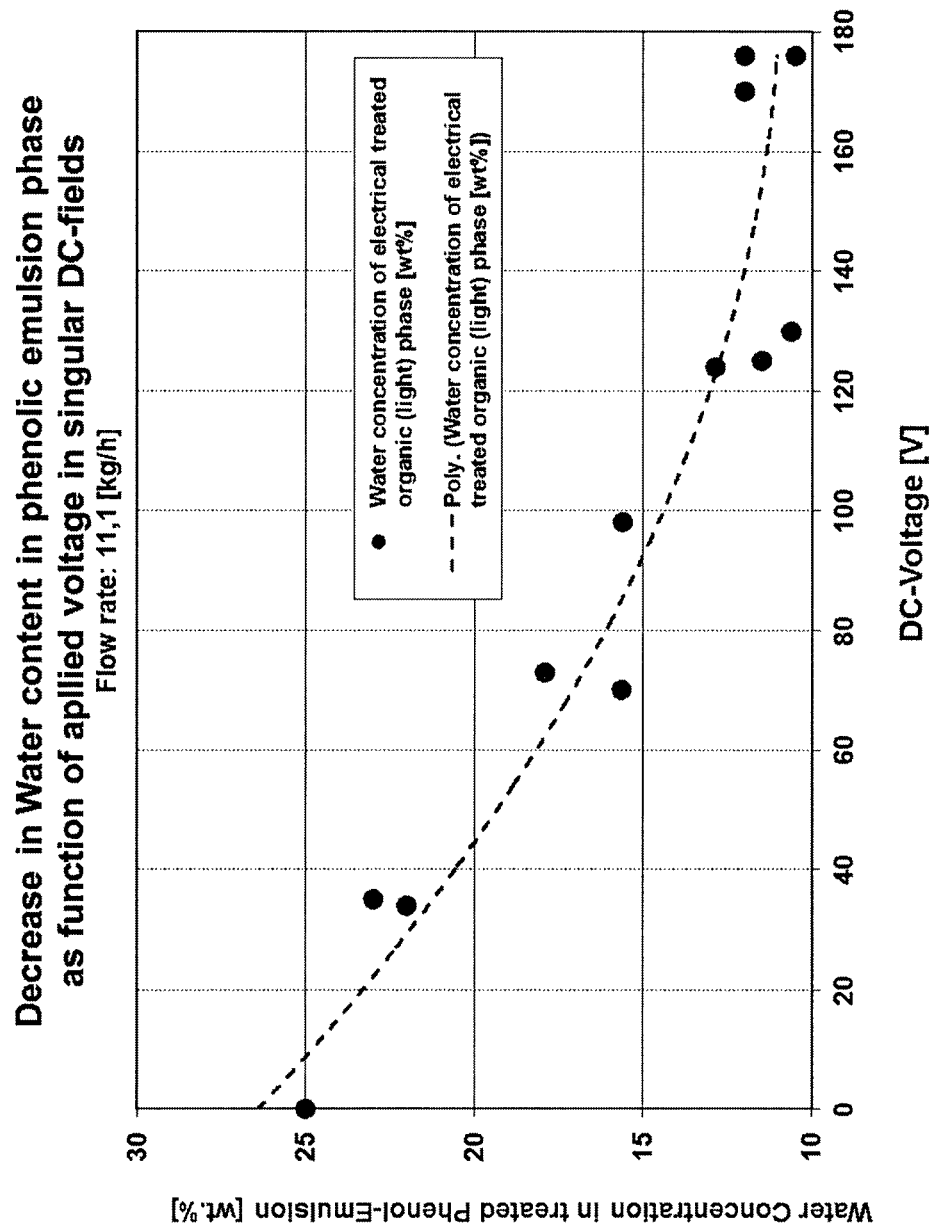
FIG. 6B a further diagram depicting the residual water content of an organic phase after electrical treatment of an emulsion according to the third embodiment of the present method; shown in FIG. 3

FIG. 6B shows principally a similar dependency of the water content of the electrical treated light (organic) phase from the applied DC-Voltage. The diagram of FIG. 6B depicts the residual water content of the light (organic) phase after electrical induced separation of a phenolic emulsion (feed) in the 3Z-horizontal decanter separator of FIG. 3 (DC, middle segment 2B) in continuous operation (emulsion mass flow rate: 11.1 kg/h) as function of introduced DC-Voltage by applying a singular DC-field.

The obtained results of example 3 show that the phenolic emulsion of Tab. 1 could be completely separated in a DC-field within less than 2 min by applying at least an electrical field strength of more than 7.000 V/m at low specific electrical power input of 0.9 Wh/kg.

Example 4: Continuous Operated Enhanced Break-Up of a Phenolic (W/O)-Emulsion of Tab.1 in Singular HF/AC-Fields The experimental used separation device is the 1Z-horizontal glass decanter separator (subsequently designated as 1Z-decanter separator) of FIG. 2. The bare metallic electrode (3B, diameter 1 mm) is arranged in the symmetrical axis of the cylindrical apparatus. The HF/AC-field is generated between the electric conductive counter electrodes (3A, 2 m $H_2SO_4$) and the central positioned metal electrode (3B). The electrodes are insulated against each other by the glass wall. The HF/AC-field is generated by a High Frequency/High Voltage-generator (1).

The phenolic (W/O)-emulsion of Tab.1 is continuously transferred via peristaltic pump to the inlet of the 1Z-decanter separator. The phenolic model emulsion of Tab.1 passes the vessel, whereby HF/AC-fields with varying AC-voltages at 16,000 Hz are applied. The experiments were conducted with a constant mass flow rate of the phenolic emulsion of 11.1 kg/h (=fixed space time) at defined electrical HF/AC-voltages at a high frequency of 16,000 Hz. The applied electrical field strengths in this test series are in the range from 10,000 to 50,000 V/m. The resulting outlet (organic light) phases are analyzed on their residual water contents.

Figure 7A:
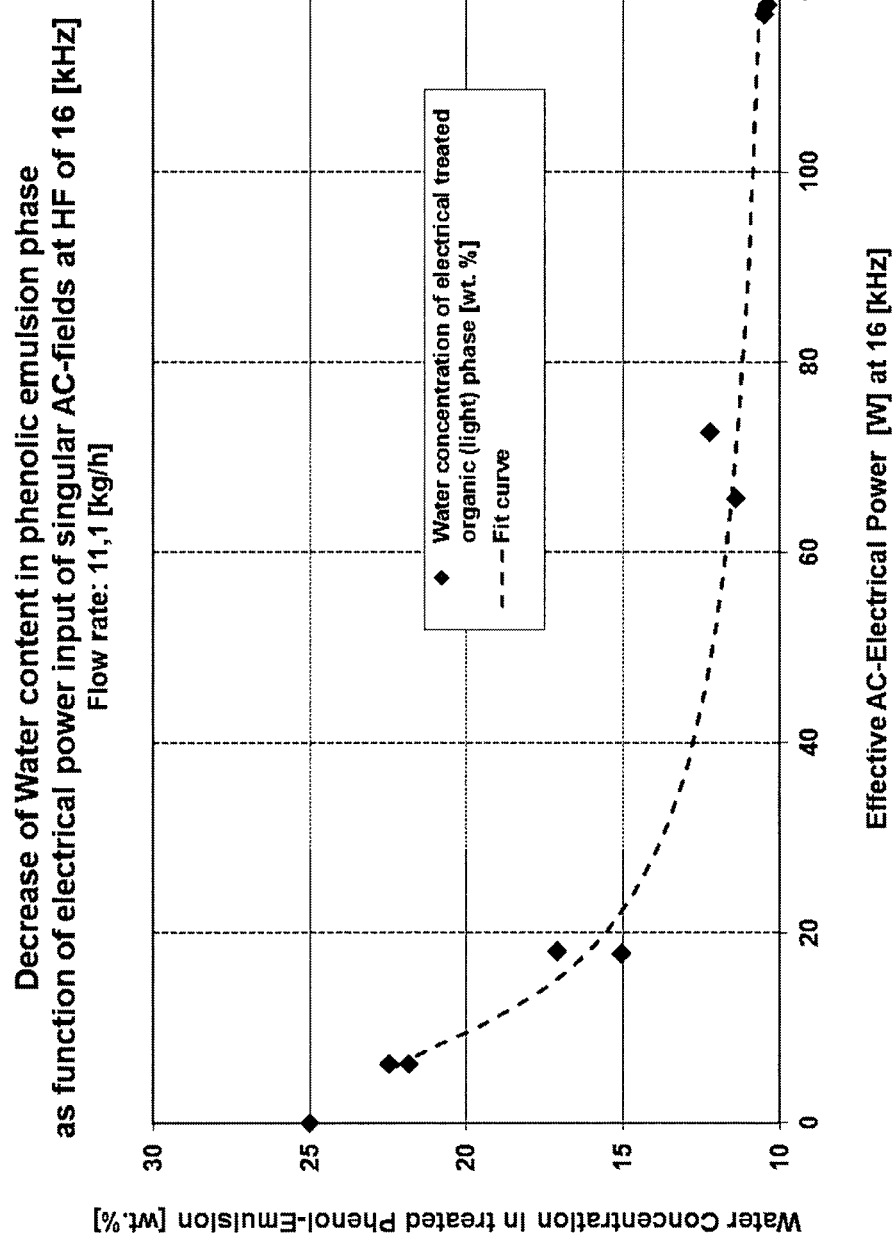
FIG. 7A a further diagram depicting the residual water content of an organic phase after electrical treatment of an emulsion according to the second embodiment of the present method; shown in FIG. 2

FIG. 7A shows the resulting water content in the light (organic) outlet phase as function of the effective electrical alternating current power input in W at a High Frequency of 16,000 Hz. The diagram of FIG. 7A depicts the residual water content of the light (organic) phase after electrical induced separation of a phenolic emulsion (feed) in the 1Z-horizontal decanter separator of FIG. 2 in continuous operation (emulsion mass flow rate: 11.1 kg/h) as function of introduced HF/AC electrical power in W by applying a singular AC-field at high frequency of 16,000 Hz.

An AC-power input of at least 120 W is necessary to guarantee the complete separation (equilibrium water content of 10 wt %) of the model emulsion at a constant mass flow rate of 11.1 kg/h through the 1Z-horizontal decanter separator (=fixed average space time). The obtained results of example 4 show, that the phenolic emulsion of Tab. 1 could be completely separated in a HF/AC-field at 16,000 Hz within less than 2 min by applying at least an electrical field strength of 50,000 V/m at a specific electrical power input of 10.8 Wh/kg. The electrical AC-power input is thus remarkable higher in comparison with the singular DC-field. This is caused by the high capacity of the glass wall tube mass of the apparatus.

Figure 7B:
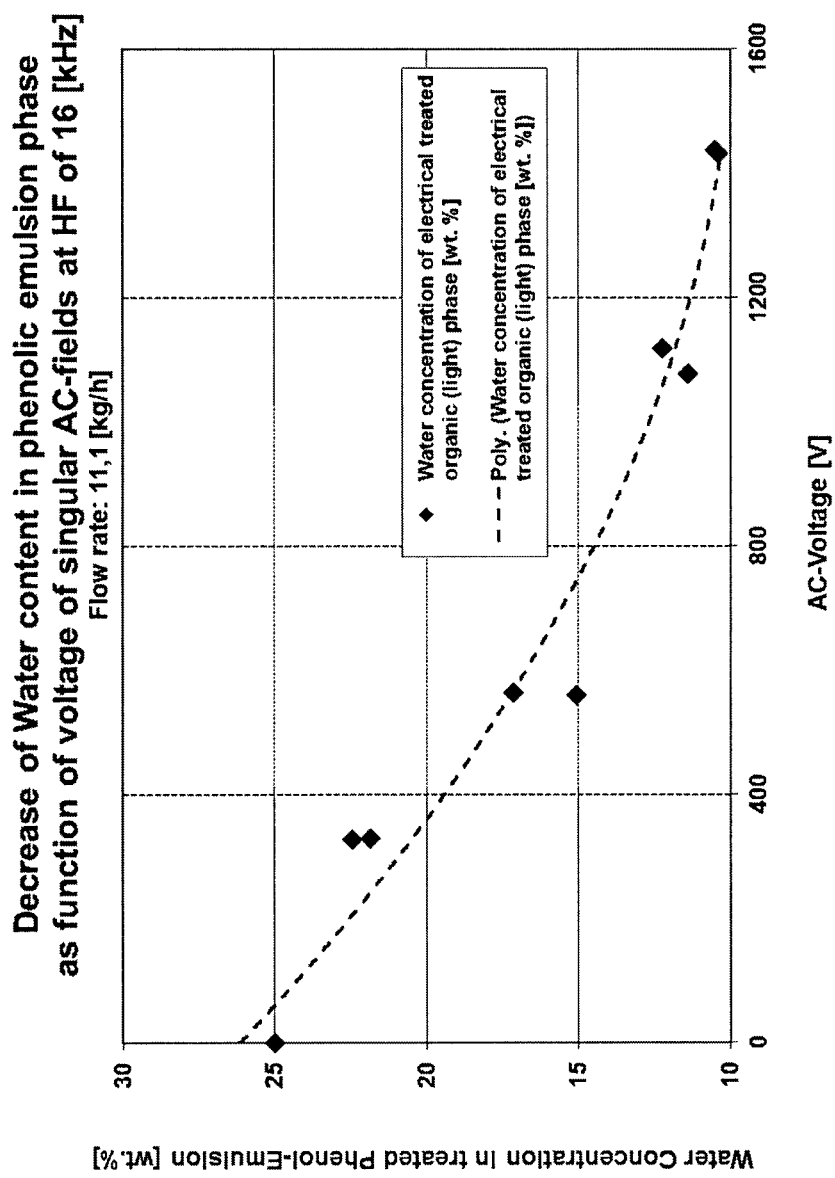
FIG. 7B a further diagram depicting the residual water content of an organic phase after electrical treatment of an emulsion according to the second embodiment of the present method; shown in FIG. 2

FIG. 7B shows principally a similar dependency of the water content of the electrical treated light (organic) phase by the applied HF/AC-Voltage at a constant high frequency of 16,000 Hz. The diagram of FIG. 7B depicts the residual water content of the light (organic) phase after electrical induced separation of a phenolic emulsion (feed) in the 1Z-horizontal decanter separator of FIG. 2 in continuous operation (emulsion mass flow rate: 11.1 kg/h) as function of introduced effective HF/AC-Voltage by applying a singular AC field at high frequency of 16,000 Hz.

Example 4 shows that singular HF/AC-fields can enhance the break-up of (W/O)-emulsions, although the specific electrical power input is higher in comparison to singular DC-fields. The phenolic emulsion can be completely broken up within less than 1.7 min. A re-emulsification at 10,000 Hz was not determined, as it is described in Draxler et al. Furthermore, an optimal high frequency was also not determined.

Example 5 (Comparative Example): Continuous Separation of a Phenolic (W/O)-Emulsion of Tab.1 in Parallel Combined (Overlaid) HF-AC-/DC-Fields Example 5 should principally demonstrate the knowledge that overlaid HF/AC-/DC-fields (parallel interconnection) should show advantages in the efficiency of separation of (W/O)-emulsions. EP 468 954 A2 describes a low separation degree in case of the usage of singular HF/AC-fields, whereby the alternating or better switching polarity of the water molecules (changed and disadvantageously shapes of dipoles) are the reason for the low separation degree in case of stand-alone HF/AC-fields. Furthermore, EP 468 954 A2 describes the low electrical energy utilization in HF/AC-fields especially for the separation (e.g. parallel warming-up of media phase). No information can be found in EP 468 954 A2 regarding the applied Voltage and/or electrical power of both HF/AC- and overlaid DC-fields.

The experimental applied separation device is shown in FIG. 4 the dimensions of the separator is principally similar to the 1Z-decanter separator. The metallic electrode (3B, diameter 1 mm) is arranged in the symmetrical axis of the cylindrical apparatus and furthermore is earthed. The HF/AC-field is generated between the electric conductive counter electrodes (3A, 2 m $H_2SO_4$) and the central positioned bare metallic electrode (3B). The DC-field is generated between an inner positioned metallic tube (3C) and the central positioned metal electrode (3B). Both electrical fields are generated by the corresponding generators (AC: 1A, DC: 1B).

The phenolic (W/O)-emulsion of Tab.1 is continuously transferred via peristaltic pump to the inlet of the 1Z-decanter separator. The model emulsion passes the vessel, whereby following field-combinations were applied:
a. Singular HF/AC-Field at a High Frequency of 24,000 Hz
b. HF/AC-Field at a High Frequency of 24,000 Hz overlaid with a DC-field of 12 V.
c. HF/AC-Field at a High Frequency of 24,000 Hz overlaid with a DC-field of 25 V.

The experiments were conducted with a constant mass flow rate of the phenolic model emulsion of 11.1 kg/h at defined electrical total power inputs. The resulting outlet phases (organic light phase) were analyzed on their residual water content. The applied electrical field strengths in this test series were in the range from 500 to 50,000 V/m.

Figure 8:
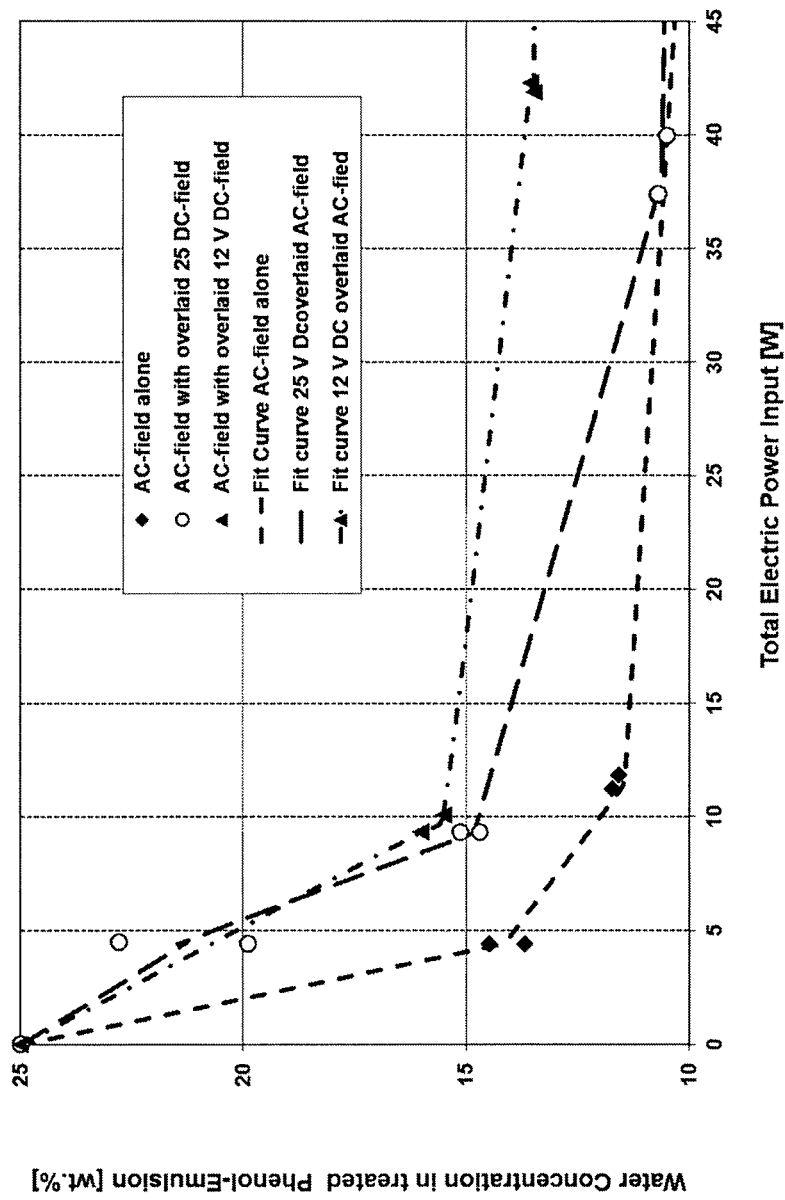
FIG. 8 a further diagram depicting the residual water content of an organic phase after electrical treatment of an emulsion according to a known method (EP 468 954 A2); according to the fourth embodiment of the present method; shown in FIG. 4

FIG. 8 shows the results, whereby the resulting water content in the light (organic) outlet phase is shown as function of the total electrical power input in W. The diagram of FIG. 8 depicts the residual water content of the light (organic) phase after electrical induced separation of a phenolic emulsion (feed) in the 1Z-horizontal decanter separator of FIG. 4 in continuous operation (emulsion mass flow rate: 11.1 kg/h) as function of introduced effective electrical power in W by applying a parallel (overlaid) combination of HF/AC-fields at a high frequency of 16,000 Hz with DC-fields of 0-25 V. The residence time was fixed and less than 2 min.

FIG. 8 demonstrates that the total electrical power input in W for achieving similar residual water contents of the resulting separated organic phase is lowest by applying a singular HF/AC-field at constant 24,000 Hz. HF/AC-fields, which were overlaid with a DC-field of 12 V or 25 V need a higher electrical power input to obtain a similar water concentration in the analyzed light (organic) phase of the electrical treated phenolic emulsion. These results differ from EP 468 954 A2, especially when treating a phenolic model emulsion.

Example 6: Continuous Separation of a Phenolic (W/O)-Emulsion of Tab.1 in Serial Combined DC-HF/AC-Fields (Upstream; DC; Downstream: HF/AC) at a Constant Total Electrical Power Input of Only 5 W An upstream orientated DC-field will be serial combined with a downstream positioned HF/AC-field at a high frequency of 16,000 Hz. The experimental applied separation device was the 3Z-decanter separator (FIG. 3). In the $2^{nd}$-segment the DC-field is applied, followed by an HF/AC-field with a high frequency of 16,000 Hz in the $3^{rd}$-segment of the 3Z-decanter separator. The electrical fields are generated by the corresponding generators (AC: 1A, DC: 1B).

The diagram of FIG. 9 depicts the residual water content of the light (organic) phase after electrical induced separation of a phenolic emulsion (feed) in the 3Z-horizontal decanter separator of FIG. 3 in continuous operation (emulsion mass flow rate: 11.1 kg/h) as function of percentage rate of DC-power on total electrical power input of constant 5 W when applying a serial combination of an upstream orientated DC field with a downstream or following HF/AC field at a high frequency of 16,000 Hz. The applied electrical field strengths in this test series were in the range from 500 to 10,000 V/m. The residence time was fixed and less than 2 min.

Figure 9A:
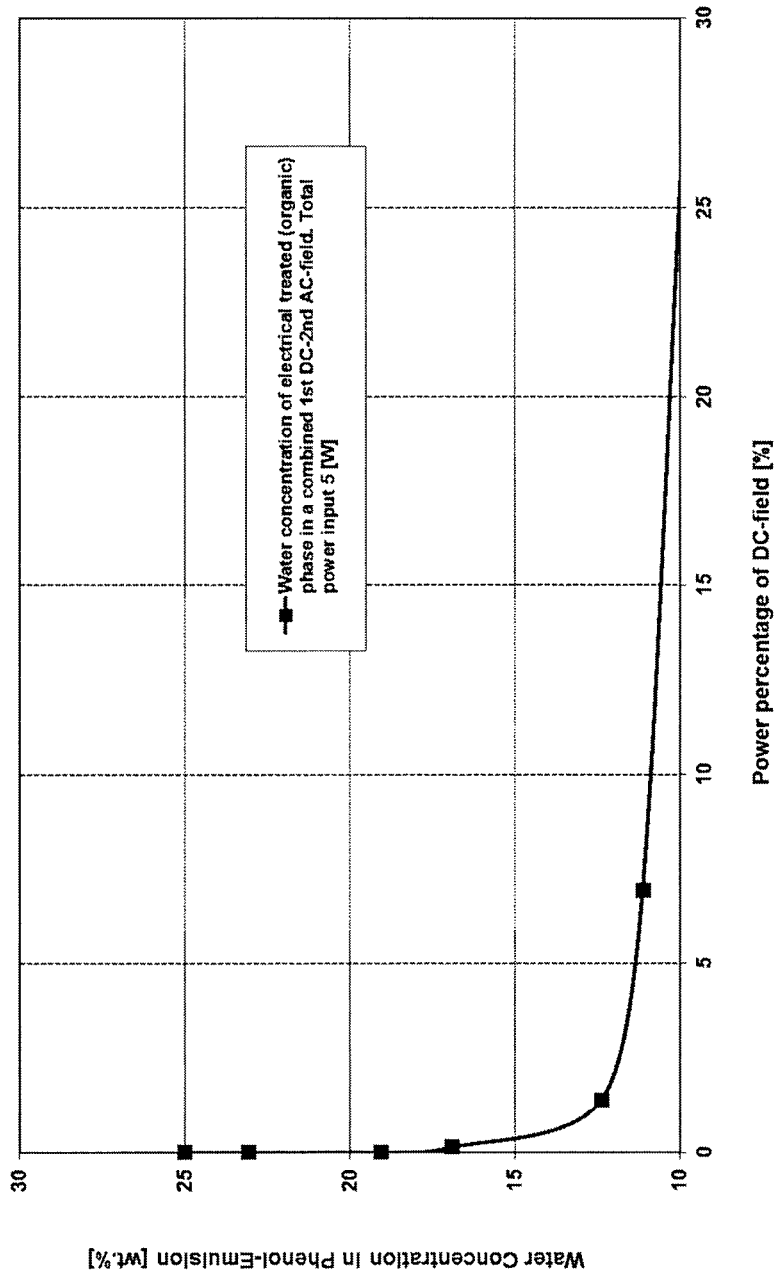
FIG. 9A a further diagram depicting the residual water content of an organic phase after electrical treatment of an emulsion according to the third embodiment of the present method; shown in FIG. 3
Figure 9B:
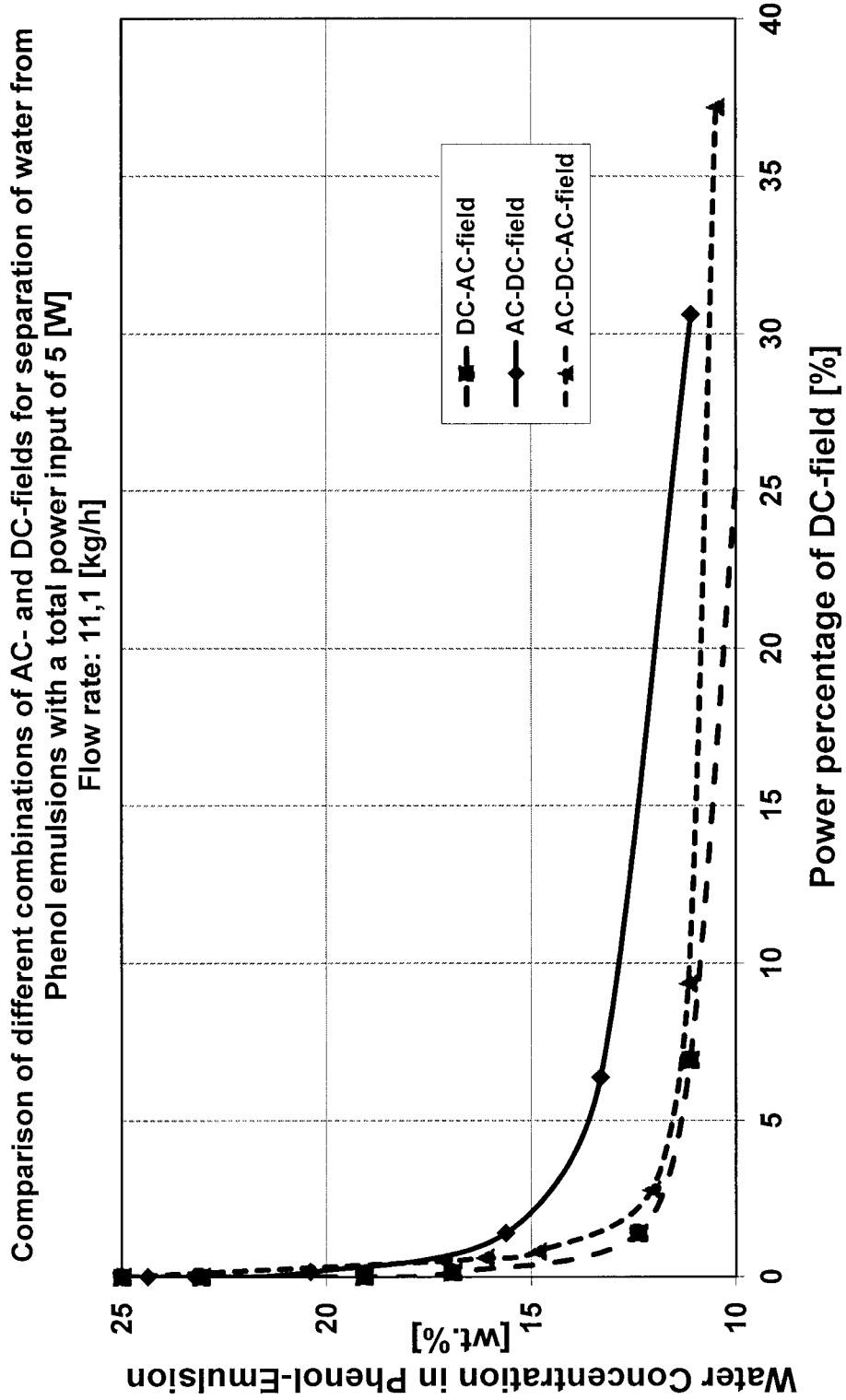
FIG. 9B a further diagram depicting the residual water content of an organic phase after electrical treatment of an emulsion according to the third embodiment of the present method; shown in FIG. 3.

FIG. 9A and FIG. 9B show that already with a total electrical power input of only 5 W the phenolic model emulsion of Tab.1 can be completely separated at a constant mass flow of 11.1 kg/h (=fixed average space time) by a serial combined upstream orientated $1^{st}$ DC-field of 1.25 W (25% of total electrical power input) with a downstream $2^{nd}$ positioned HF-AC-field at a constant high frequency of 16,000 Hz of 3.75 W (75% of total electrical power input). The phenolic emulsion can be completely broken up within less than 1.5 min.

Example 6 shows that a complete break-up and separation of a phenolic (W/O)-emulsion could be done by a serial combination of an upstream DC-field with a downstream orientated HF/AC-field within less than 1.5 min. Furthermore, both the total electrical power input is minimal with 5 W resp. 0.45 Wh/kg at advantageously low electrical field strength in comparison to singular DC-fields or singular HF/AC-fields.

Example 7: Discontinuous Separation of Phenolic (W/O)-Emulsions or (O/W)-Emulsions in HF/AC-Field with Different Initial Water Concentration, Especially in the Range Between 20 and 80 [Wt %]

The phenolic (W/O)-emulsion or (O/W)-emulsion with a defined initial water content in the range between 20 and 80 [wt %] is transferred to the LAB GLASS TUBE SEPARATOR of FIG. 1. The Lab Glass Tube Separator is operated discontinuously, whereby the emulsion is filled in the separator. Then a defined HF/AC-field of 1,000 [V] and 65 [mA] at a fixed high frequency of 16,000 [Hz] is applied on the emulsion. The necessary separation time until the emulsion is completely broken-up and settled was measured and recorded.

Figure 10:
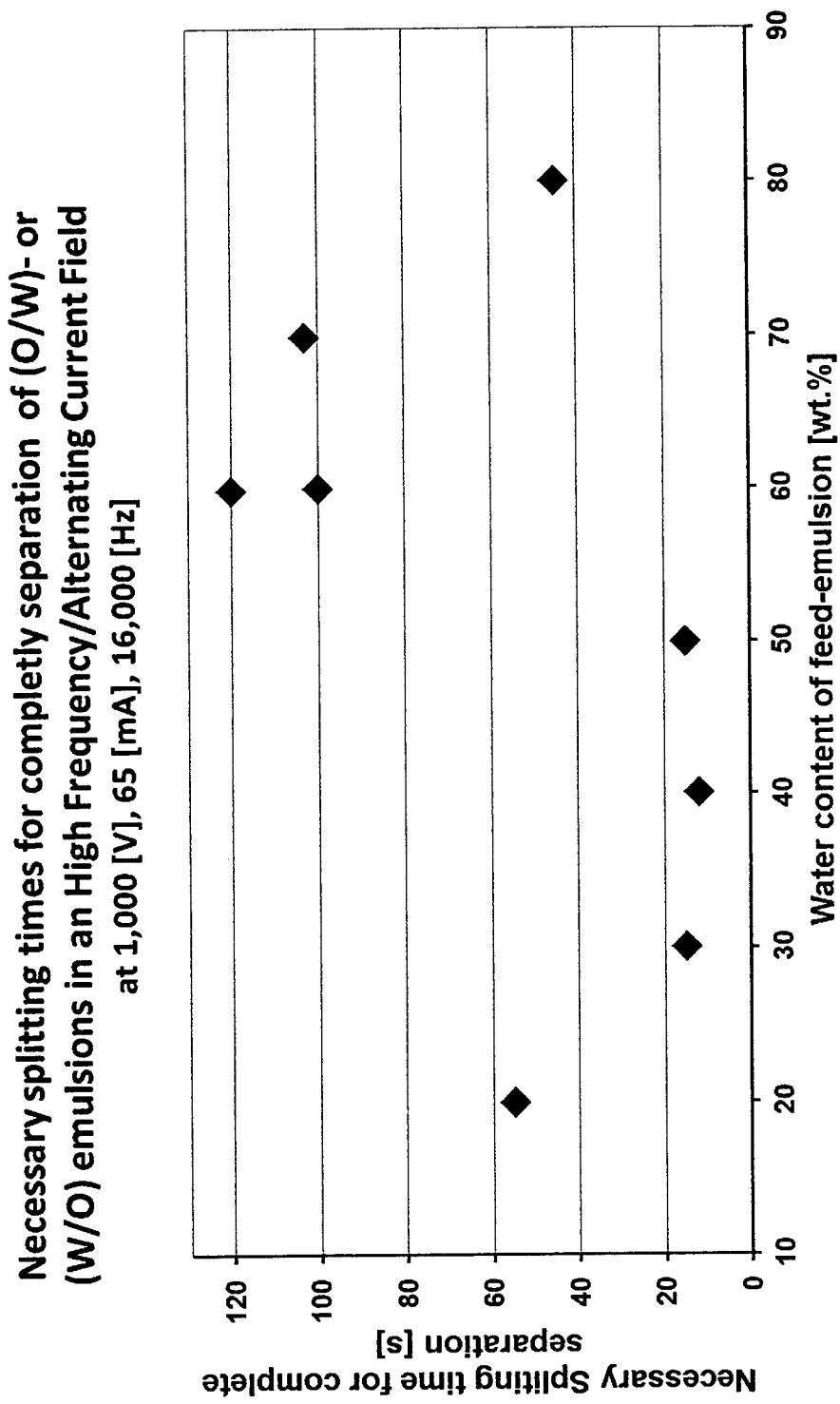
FIG. 10 a further diagram depicting the required splitting time for complete separation of electrical treated (W/O)- or (O/W)-emulsions with different initial water concentration using a discontinuous method in a device according to the first embodiment shown in FIG. 1

FIG. 10 shows the achieved results. Both emulsion types, (O/W)- and (W/O)-emulsion, can be advantageously separated by applying an HF/AC-field. All emulsions can be completely split in less than 2 [min] at the defined conditions of 1,000 [V] and 65 [mA] at a fixed high frequency of 16,000 [Hz]. It is impressive shown, that especially the (W/O)-type [<50 [Vol. %] can be split completely in less than 1 [min], preferably lower than 20 [s] in case of starting water contents between 30-50 [wt. %] of the (W/O)-emulsion. The following illustrated increase in splitting time in the case of (O/W)-emulsions could be explained by the change of the dominating resp. continuous phase from organic to aqueous and the changed dielectric properties.

The invention claimed is:

1. A method for the separation of at least one liquid/liquid (L/L) emulsion with a water content of up to 70 mass % comprising applying at least one time dependent electrical field,
    wherein
    the at least one electrical field is a singular alternating current (AC) field with an electrical field strength between 2,000 and 100,000 V/m and a frequency (HF) between >10,000 Hz and 200,000 Hz, and
    wherein separation of the at least one L/L emulsion performed with a de-emulsification rate of at least 95% is achieved in less than 5 minutes.

2. The method according to claim 1, wherein the at least one AC-field is applied with an electrical field strength between 4,000 and 70,000 V/m.

3. The method according to claim 1, wherein the at least one AC-field is applied with a frequency between 12,000 and 150,000 Hz.

4. The method according to claim 1, wherein the emulsion to be separated is a phenolic water emulsion of the Hock-synthesis with an equimolar Phenol/Acetone-ratio and water contents up to 70 wt. %.

5. The method according to claim 1, wherein the at least one AC-field is applied with an electrical field strength between 30,000 and 50,000 V/m and a frequency between 16,000 and 40,000 Hz.

6. The method according to claim 1, wherein separation of the at least one L/L emulsion performed with a de-emulsification rate of at least 95% is achieved in less than 3 minutes.

7. The method according to claim 1, wherein separation of the at least one L/L emulsion performed with a de-emulsification rate of at least 95% is achieved in less than 2 minutes.

* * * * *